US011411292B2

(12) United States Patent
Kirino

(10) Patent No.: US 11,411,292 B2
(45) Date of Patent: Aug. 9, 2022

(54) WAVEGUIDE DEVICE, ELECTROMAGNETIC RADIATION CONFINEMENT DEVICE, ANTENNA DEVICE, MICROWAVE CHEMICAL REACTION DEVICE, AND RADAR DEVICE

(71) Applicants: Nidec Corporation, Kyoto (JP); WGR Co., Ltd., Kyoto (JP)

(72) Inventor: Hideki Kirino, Kyoto (JP)

(73) Assignee: WGR CO., LTD., Kyoto (JP)

( * ) Notice: Subject to any disclaimer, the term of this patent is extended or adjusted under 35 U.S.C. 154(b) by 401 days.

(21) Appl. No.: 16/742,989

(22) Filed: Jan. 15, 2020

(65) Prior Publication Data

US 2020/0227807 A1    Jul. 16, 2020

(30) Foreign Application Priority Data

Jan. 16, 2019  (JP) .............................. JP2019-004875

(51) Int. Cl.
*H05B 6/70* (2006.01)
*H01P 3/12* (2006.01)
(Continued)

(52) U.S. Cl.
CPC ................ *H01P 3/12* (2013.01); *G01S 7/032* (2013.01); *H01Q 1/50* (2013.01); *H05B 6/707* (2013.01)

(58) Field of Classification Search
CPC .. H01Q 1/50; H01Q 13/06; H01P 3/12; H01P 5/024; H01P 5/107; H01P 11/002;
(Continued)

(56) References Cited

U.S. PATENT DOCUMENTS 6,191,704 B1   2/2001   Takenaga et al.
6,339,395 B1   1/2002   Hazumi et al.
(Continued)

FOREIGN PATENT DOCUMENTS

EP       1 331 688 A1    7/2003
JP     2001-267838 A    9/2001
(Continued)

OTHER PUBLICATIONS

Kirino et al., "A 76 GHz Multi-Layered Phased Array Antenna Using a Non-Metal Contact Metamaterial Waveguide", IEEE Transactions on Antennas and Propagation, vol. 60, No. 2, Feb. 2012, pp. 840-853.
(Continued)

*Primary Examiner* — Tuan H Nguyen
(74) *Attorney, Agent, or Firm* — Keating & Bennett

(57) ABSTRACT

A waveguide device includes a first electrical conductor including a first electrically conductive surface extending along first and second directions, a second electrical conductor including a second electrically conductive surface opposing the first electrically conductive surface, a waveguide located between the first electrical conductor and the second electrical conductor and extending along the first direction, the waveguide including an electrically-conductive waveguide surface opposing the first electrically conductive surface, and a plurality of electrically-conductive rod rows located on opposite sides of the waveguide, each rod row including a plurality of electrically conductive rods arranged along the first direction. At least one of the first electrical conductor and the second electrical conductor includes at least one hole.

24 Claims, 17 Drawing Sheets

(51) Int. Cl.
*G01S 7/03* (2006.01)
*H01Q 1/50* (2006.01)

(58) Field of Classification Search
CPC ... H01P 5/103; H01P 3/08; G01S 7/03; G01S 7/032; H05B 6/707; H05B 6/70
See application file for complete search history.

(56) References Cited

U.S. PATENT DOCUMENTS

| | | |
|---|---|---|
| 6,403,942 B1 | 6/2002 | Stam |
| 6,611,610 B1 | 8/2003 | Stam et al. |
| 6,628,299 B2 | 9/2003 | Kitayama |
| 6,661,367 B2 | 12/2003 | Sugiyama et al. |
| 6,703,967 B1 | 3/2004 | Kuroda et al. |
| 6,903,677 B2 | 6/2005 | Takashima et al. |
| 6,943,726 B2 | 9/2005 | Schneider |
| 7,161,561 B2 | 1/2007 | Kitayama |
| 7,355,524 B2 | 4/2008 | Schofield |
| 7,358,889 B2 | 4/2008 | Abe et al. |
| 7,417,580 B2 | 8/2008 | Abe et al. |
| 7,420,159 B2 | 9/2008 | Heslin et al. |
| 7,425,983 B2 | 9/2008 | Izumi et al. |
| 7,570,198 B2 | 8/2009 | Tokoro |
| 7,978,122 B2 | 7/2011 | Schmidlin |
| 8,068,134 B2 | 11/2011 | Yoshizawa |
| 8,446,312 B2 | 5/2013 | Kanamoto et al. |
| 8,543,277 B2 | 9/2013 | Higgins-Luthman |
| 8,593,521 B2 | 11/2013 | Schofield et al. |
| 8,604,968 B2 | 12/2013 | Alland et al. |
| 8,610,620 B2 | 12/2013 | Katoh |
| 8,614,640 B2 | 12/2013 | Lynam |
| 8,636,393 B2 | 1/2014 | Schofield |
| 8,730,096 B2 | 5/2014 | Kanamoto et al. |
| 8,730,099 B2 | 5/2014 | Kanamoto et al. |
| 8,779,995 B2 | 7/2014 | Kirino et al. |
| 8,803,638 B2 | 8/2014 | Kildal |
| 8,861,842 B2 | 10/2014 | Jung et al. |
| 9,286,524 B1 | 3/2016 | Mei et al. |
| 9,786,995 B2 | 10/2017 | Kirino et al. |
| 10,027,032 B2 | 7/2018 | Kirino et al. |
| 10,042,045 B2 | 8/2018 | Kirino et al. |
| 10,090,600 B2 | 10/2018 | Kirino et al. |
| 10,158,158 B2 | 12/2018 | Kirino et al. |
| 2011/0050356 A1* | 3/2011 | Nakamura ............. H01P 5/107 333/26 |
| 2011/0187614 A1 | 8/2011 | Kirino et al. |
| 2012/0092224 A1 | 4/2012 | Sauleau et al. |
| 2013/0033404 A1 | 2/2013 | Abe |
| 2015/0264230 A1 | 9/2015 | Takeda |
| 2016/0140424 A1 | 5/2016 | Wang et al. |
| 2016/0254582 A1 | 9/2016 | Jensen |
| 2016/0264065 A1 | 9/2016 | Takeda |
| 2017/0077576 A1 | 3/2017 | Kirino |
| 2017/0317427 A1 | 11/2017 | Kirino et al. |
| 2018/0040963 A1 | 2/2018 | Kirino et al. |
| 2018/0113187 A1 | 4/2018 | Vassilev et al. |
| 2018/0301817 A1 | 10/2018 | Ichinose et al. |
| 2018/0351261 A1 | 12/2018 | Kamo et al. |
| 2018/0375219 A1 | 12/2018 | Kirino et al. |
| 2019/0006743 A1 | 1/2019 | Kirino et al. |
| 2019/0067780 A1 | 2/2019 | Kirino et al. |
| 2019/0074569 A1 | 3/2019 | Kamo et al. |
| 2019/0123411 A1 | 4/2019 | Carlred et al. |
| 2019/0139914 A1 | 5/2019 | Kirino et al. |
| 2019/0140344 A1 | 5/2019 | Kirino et al. |

FOREIGN PATENT DOCUMENTS

| | | |
|---|---|---|
| JP | 2004-257848 A | 9/2004 |
| JP | 2007-259047 A | 10/2007 |
| JP | 2010-021828 A | 1/2010 |
| JP | 2012-004700 A | 1/2012 |
| JP | 2012-523149 A | 9/2012 |
| JP | 2013-032979 A | 2/2013 |
| WO | 01/67540 A1 | 9/2001 |
| WO | 2008/081807 A1 | 7/2008 |
| WO | 2010/050122 A1 | 5/2010 |
| WO | 2015/172948 A2 | 11/2015 |
| WO | 2016/163932 A1 | 10/2016 |
| WO | 2017/050817 A1 | 3/2017 |
| WO | 2018/105513 A1 | 6/2018 |
| WO | 2018/207796 A1 | 11/2018 |
| WO | 2018/207838 A1 | 11/2018 |

OTHER PUBLICATIONS

Zaman et al., "Ku Band Linear Slot-Array in Ridge Gapwaveguide Technolgy", 7th European Conference on Antennas and Propagation (EUCAP 2013)—Convened Sessions, 2013, pp. 2968-2971.
Kildal et al., "Local Metamaterial-Based Waveguides in Gaps Between Parallel Metal Plates", IEEE Antennas and Wireless Propagation Letters, vol. 8, 2009, pp. 84-87.
Pucci et al., "Design of a Dual-Mode Horn Element for Microstrip Gap Waveguide Fed Array", 7th European Conference on Antennas and Propagation (EUCAP 2013)—Convened Sessions, 2013, pp. 2976-2979.
Kildal, "Metasurfing Since 1987—A Personal Story Involving Soft and Hard Surfaces, EBG Surfaces, Cloaking, Gap Waveguides and Mass Production", 2014 IEEE Antennas and Propagation Society International Symposium, 2014, pp. 529-530.
Sehm et al., "A High-Gain 58-GHz Box-Horn Array Antenna with Suppressed Grating Lobes", IEEE Transactions on Antennas and Propagation, vol. 47, No. 7, Jul. 1999, pp. 1125-1130.
Zaman et al., "Slot Antenna in Ridge Gap Waveguide Technology", 6th European Conference on Antennas and Propagation, Mar. 2012, pp. 3243 & 3244.
Zarifi et al., "Design and Fabrication of a High-Gain 60-GHz Corrugated Slot Antenna Array With Ridge Gap Waveguide Distribution Layer", IEEE Transactions on Antennas and Propagation, vol. 64, No. 7, Jul. 2016, pp. 2905-2913.
Mustafa, "Hybrid Analog-Digital Beam-Steered Slot Antenna Array for mm-Wave Applications in Gap Waveguide Technology", Department of Electronics and Telecommunications Master of Science in Telecommunications Engineering Master's Thesis, Oct. 2015, 67 pages.
Kirino et al., "Simplified Wavelength Calculations for Fast and Slow Wave Metamaterial Ridged Waveguides and their Application to Array Antenna Design", Proceedings of the International Symposium on Antennas & Propagation, Oct. 25, 2013, 4 pages.
Ahmadi et al., "Direct Coupled Resonator Filters Realized by Gap Waveguide Technology", IEEE Transactions on Microwave Theory and Techniques, vol. 63, No. 10, Oct. 2015, pp. 3445-3452.
Zarifi et al., "A High Gain Ridge Gap Waveguide Fed Slot Antenna Array for 60 GHz Applications", Chalmers University of Technology, https://research.chalmers.se, Apr. 10, 2016, 4 pages.

* cited by examiner

WAVEGUIDE DEVICE, ELECTROMAGNETIC RADIATION CONFINEMENT DEVICE, ANTENNA DEVICE, MICROWAVE CHEMICAL REACTION DEVICE, AND RADAR DEVICE

CROSS REFERENCE TO RELATED APPLICATION

The present invention claims priority under 35 U.S.C. § 119 to Japanese Application No. 2019-004875 filed on Jan. 16, 2019, the entire contents of which are hereby incorporated herein by reference.

FIELD OF THE INVENTION

The present disclosure relates to a waveguide device, an electromagnetic radiation confinement device, an antenna device, a microwave chemical reaction device, and a radar device.

BACKGROUND

Examples of waveguiding structures having an artificial magnetic conductor are disclosed in the specification of U.S. Pat. No. 8,779,995, the specification of U.S. Pat. No. 8,803,638, the specification of European Patent Application Publication No. 1331688 and H. Kirino and K. Ogawa, "A 76 GHz Multi-Layered Phased Array Antenna using a Non-Metal Contact Metamaterial Waveguide", IEEE Transaction on Antenna and Propagation, Vol. 60, No. 2, pp. 840-853, February, 2012 and A. Uz. Zaman and P.-S. Kildal, "Ku Band Linear Slot-Array in Ridge Gapwaveguide Technology, EUCAP 2013, 7th European Conference on Antenna and Propagation. An artificial magnetic conductor is a structure which artificially realizes the properties of a perfect magnetic conductor (PMC), which does not exist in nature. One property of a perfect magnetic conductor is that "a magnetic field on its surface has zero tangential component". This property is the opposite of the property of a perfect electric conductor (PEC), i.e., "an electric field on its surface has zero tangential component". Although no perfect magnetic conductor exists in nature, it can be embodied by an artificial structure, e.g., an array of a plurality of electrically conductive rods. An artificial magnetic conductor functions as a perfect magnetic conductor in a specific frequency band which is defined by its structure. An artificial magnetic conductor restrains or prevents an electromagnetic wave of any frequency that is contained in the specific frequency band (propagation-restricted band) from propagating along the surface of the artificial magnetic conductor. For this reason, the surface of an artificial magnetic conductor may be referred to as a high impedance surface.

In the waveguide devices disclosed in the specification of U.S. Pat. No. 8,779,995, the specification of U.S. Pat. No. 8,803,638, the specification of European Patent Application Publication No. 1331688 and H. Kirino and K. Ogawa, "A 76 GHz Multi-Layered Phased Array Antenna using a Non-Metal Contact Metamaterial Waveguide", IEEE Transaction on Antenna and Propagation, Vol. 60, No. 2, pp. 840-853, February, 2012 and A. Uz. Zaman and P.-S. Kildal, "Ku Band Linear Slot-Array in Ridge Gapwaveguide Technology, EUCAP 2013, 7th European Conference on Antenna and Propagation, an artificial magnetic conductor is realized by a plurality of electrically conductive rods which are arrayed along row and column directions. Such rods may also be referred to as posts or pins. Each of these waveguide devices includes, as a whole, a pair of opposing electrically conductive plates. One conductive plate has a ridge protruding toward the other conductive plate, and stretches of an artificial magnetic conductor extending on both sides of the ridge. An upper face (electrically-conductive face) of the ridge is opposed to, via a gap, an electrically conductive surface of the other conductive plate. An electromagnetic wave of a wavelength which is contained in the propagation-restricted band of the artificial magnetic conductor propagates along the ridge, in the space (gap) between this conductive surface and the upper face of the ridge.

The specification of U.S. Pat. No. 9,786,995 and the specification of U.S. Pat. No. 10,027,032 disclose the construction and operation of a waveguide device and an antenna device utilizing an artificial magnetic conductor, as well as various application examples utilizing antenna devices.

SUMMARY

The present disclosure discloses waveguide devices and electromagnetic radiation confinement devices with novel structures that can be utilized in various applications, in which holes may be provided in component elements to confine electromagnetic waves.

A waveguide device according to one example embodiment of the present disclosure includes a first electrical conductor including a first electrically conductive surface extending along a first direction and along a second direction that intersects the first direction, a second electrical conductor including a second electrically conductive surface opposing the first electrically conductive surface, a waveguide located between the first electrical conductor and the second electrical conductor and extending along the first direction, the waveguide including an electrically-conductive waveguide surface opposing the first electrically conductive surface, and a plurality of electrically-conductive rod rows located on opposite sides of the waveguide, each rod row including a plurality of electrically conductive rods arranged along the first direction, each electrically conductive rod including a root that is connected to the second electrically conductive surface and a leading end opposing the first electrically conductive surface. At least one of the first electrical conductor and the second electrical conductor includes at least one hole that is located in a position adjacent to or overlapping an electrically conductive rod included in the plurality of rod rows as viewed along a third direction which is perpendicular or substantially perpendicular to both the first and second directions. An opening of the at least one hole has a width which is smaller than an interval between centers of two adjacent electrically conductive rods that are the closest to the hole among electrically conductive rods included in the plurality of rod rows. The at least one hole is located in a position not overlapping the waveguide as viewed along the third direction.

An electromagnetic radiation confinement device according to another example embodiment of the present disclosure includes a first electrical conductor including a first electrically conductive surface extending along a first direction and along a second direction that intersects the first direction, a second electrical conductor including a second electrically conductive surface opposing the first electrically conductive surface, a plurality of electrically conductive rods arranged in rows and columns between the first electrical conductor and the second electrical conductor, each electrically conductive rod including a root that is connected to the second electrically conductive surface and a leading end opposing the first electrically conductive surface. At least one of the first electrical conductor and the second electrical conductor includes at least one hole that is located in a position between two adjacent electrically conductive rods among the plurality of electrically conductive rods and opposing the second electrically conductive surface or the first electrically conductive surface, or in a position overlapping an electrically conductive rod included in the plurality of electrically conductive rods, as viewed along a third direction which is perpendicular to both the first and second directions. An opening of the at least one hole has a width which is smaller than an interval between centers of two adjacent electrically conductive rods that are the closest to the hole.

According to example embodiments of the present disclosure, waveguide devices and electromagnetic radiation confinement devices are usable in a large number of applications and include holes in component elements thereof.

The above and other elements, features, steps, characteristics and advantages of the present disclosure will become more apparent from the following detailed description of the example embodiments with reference to the attached drawings.

Figure 1A:
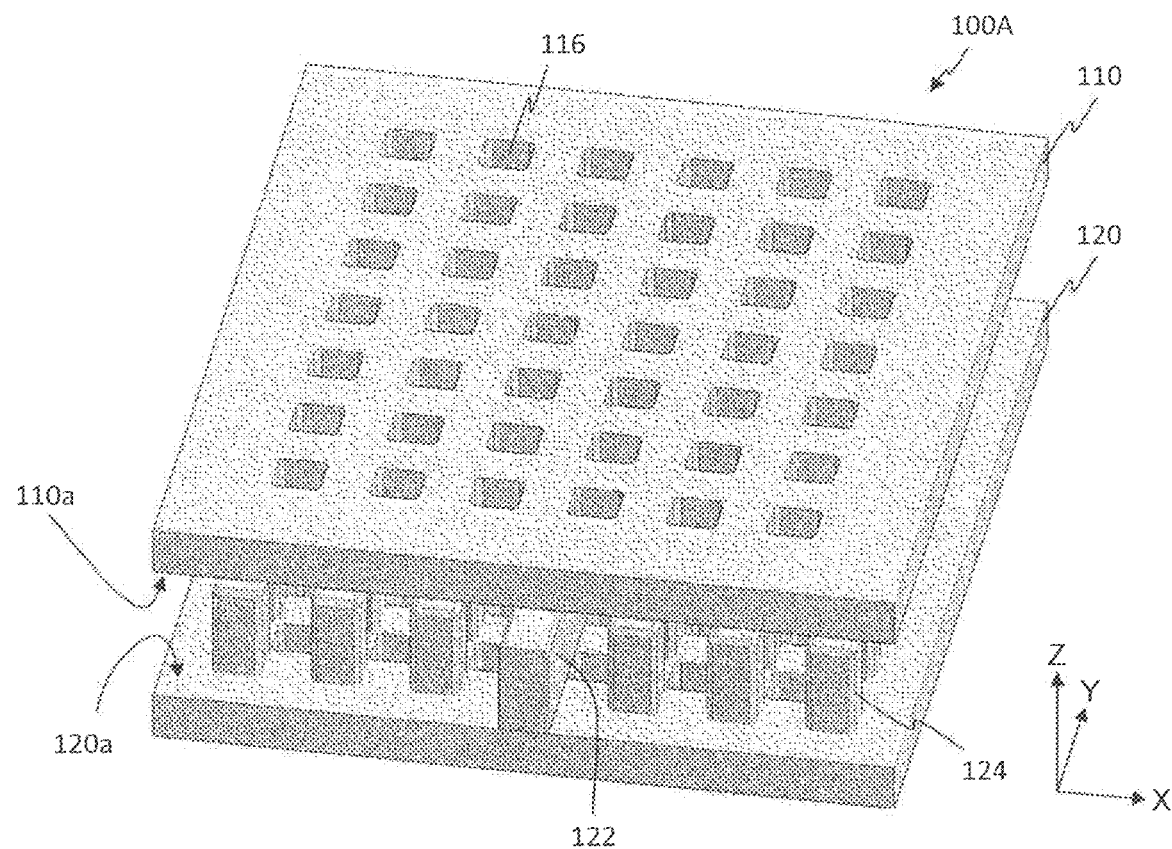
FIG. 1A is a perspective view showing a waveguide device according to a first example embodiment of the present disclosure.

DETAILED DESCRIPTION (Findings Forming the Basis of the Present Disclosure)

Prior to describing example embodiments of the present disclosure, findings that form the basis of the present disclosure will be described.

Ridge waveguides which are disclosed in the aforementioned the specification of U.S. Pat. No. 8,779,995, the specification of U.S. Pat. No. 8,803,638, the specification of European Patent Application Publication No. 1331688, the specification of U.S. Pat. No. 9,786,995, the specification of U.S. Pat. No. 10,027,032 and H. Kirino and K. Ogawa, "A 76 GHz Multi-Layered Phased Array Antenna using a Non-Metal Contact Metamaterial Waveguide", IEEE Transaction on Antenna and Propagation, Vol. 60, No. 2, pp. 840-853, February, 2012 and A. Uz. Zaman and P.-S. Kildal, "Ku Band Linear Slot-Array in Ridge Gapwaveguide Technology, EUCAP 2013, 7th European Conference on Antenna and Propagation are provided in a waffle iron structure that is capable of functioning as an artificial magnetic conductor. A ridge waveguide in which such an artificial magnetic conductor is utilized (which may hereinafter be referred to as "WRG" (Waffle-iron Ridge waveguide)) based on the present disclosure is able to realize an antenna feeding network with low losses in the microwave or the millimeter wave band. Moreover, use of such a ridge waveguide allows antenna elements (also referred to as radiating elements) to be disposed with a high density. Examples of the fundamental construction and operation of such a waveguide structure are disclosed in the specification of U.S. Pat. No. 9,786,995 and the specification of U.S. Pat. No. 10,027,032. The entire disclosure of these publications is incorporated herein by reference.

Typically, a waffle iron structure is composed of two electrically conductive members: an electrically conductive member that has a plurality of electrically-conductive rods thereon; and another electrically conductive member that has an electrically conductive surface opposing the leading ends of the respective rods. These two conductive members do not need to be electrically connected; therefore, in this respect, a waffle iron structure is relatively easy to manufacture and assemble. However, the surface of each such conductive member needs to be a continuous surface that is electrically conductive. For this reason, at least the surface of each conductive member needs to be uninterruptedly covered with a metal. This constraint has somewhat limited the applications of waffle iron structures. However, the inventors have found that, even if each conductive member is holed, functionality as an artificial magnetic conductor is maintained so long as the aperture diameter of the holes is small. The holes may be throughholes extending through the conductive member, or bottomed holes that do not extend through the conductive member. In the following description, a bottomed hole may be referred to as a "dent". Given a free space wavelength $\lambda o$ of an electromagnetic wave that is to be confined by the waffle iron structure, functionality as an artificial magnetic conductor will be conserved so long as the aperture diameter (which is the diameter in the case of a circular shape, or the length of a longer side in the case of a rectangular shape) of the holes is less than $\lambda o/4$. Even if the aperture diameter is equal to or greater than $\lambda o/4$, so long as it is less than $\lambda o/2$, an electromagnetic wave can be prevented from passing through a hole (which may even be a throughhole) to leak to the outside. Thus, a waffle iron structure at least one of whose conductive members has holes (e.g., throughholes or dents) can be used as a confinement member for preventing leakage of electromagnetic waves out of a microwave integrated circuit. When either one of the conductive members has a ridge-shaped waveguide member(s) thereon, a WRG structure can be constituted. Furthermore, the waveguide surface of the ridge-shaped waveguide member(s) may also have its own throughholes or dents, so long as the aperture diameter thereof is small. Adopting such a structure will allow a wider range of applications for a waffle iron structure.

A waveguide device according to the present disclosure can be utilized in various other applications, without being limited to antenna devices. A waveguide device according to the present disclosure can be utilized in various kinds of devices, such as microwave chemical reaction devices or terahertz spectroscopic analysis devices, for example. The present disclosure also provides a novel electromagnetic radiation confinement device having a waffle iron structure. Such devices may also be reduced in weight by virtue of a multitude of holes made in them. In the present specification, a "waffle iron structure" means a structure having a plurality of electrically conductive rods arrayed on a conductive member, such that the structure attains a confinement function of electromagnetic radiation.

Hereinafter, illustrative example embodiments of the present disclosure will be described in more detail. Note however that unnecessarily detailed descriptions may be omitted. For example, detailed descriptions on what is well known in the art or redundant descriptions on what is substantially the same constitution may be omitted. This is to avoid lengthy description, and facilitate the understanding of those skilled in the art. The accompanying drawings and the following description, which are provided by the inventors so that those skilled in the art can sufficiently understand the present disclosure, are not intended to limit the scope of claims. In the present specification, identical or similar constituent elements are denoted by identical reference numerals.

Example Embodiment 1

Figure 1B:
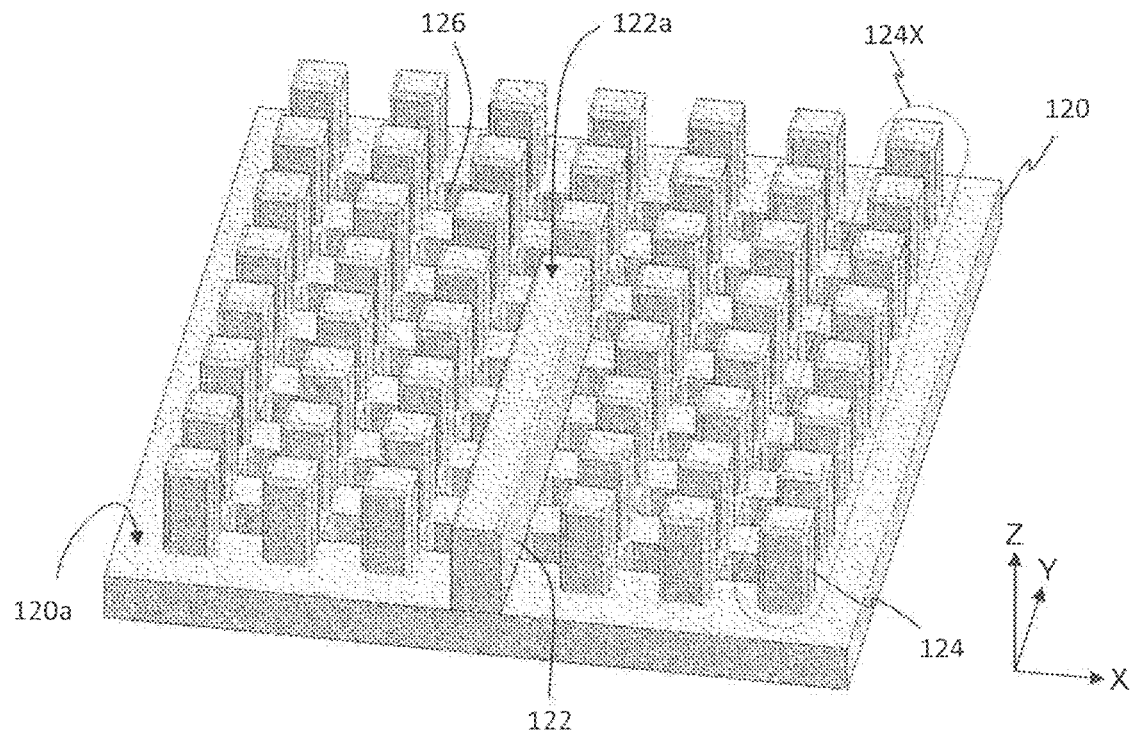
FIG. 1B is a perspective view showing the structure of the waveguide device according to the first example embodiment of the present disclosure, with a first conductive member being removed therefrom.
Figure 1C:
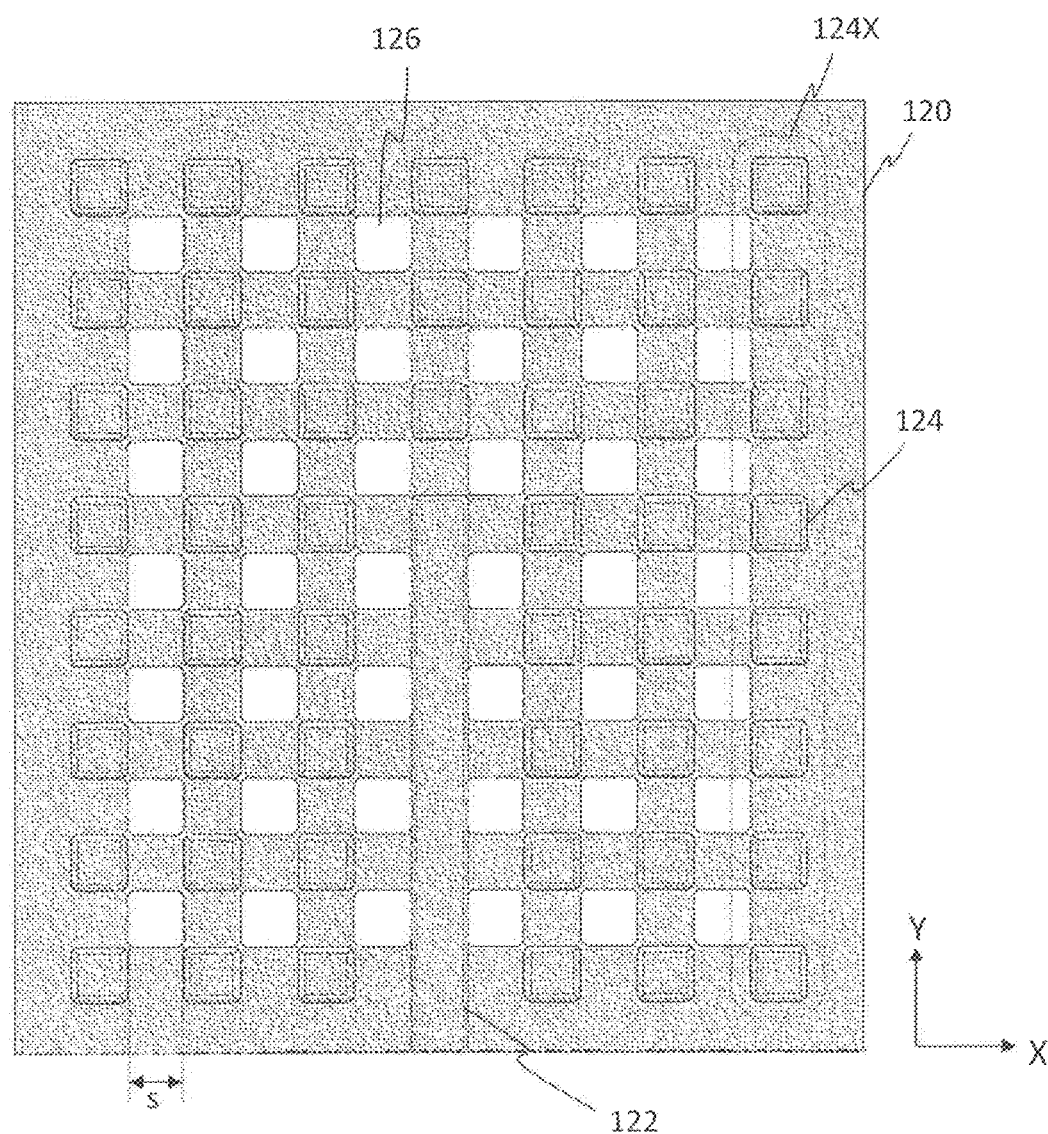
FIG. 1C is a plan view showing the structure of the waveguide device according to the first example embodiment of the present disclosure, with the first conductive member being removed therefrom.

FIG. 1A is a perspective view showing a waveguide device 100A according to an illustrative first example embodiment of the present disclosure. FIG. 1B is a perspective view showing the structure of the waveguide device 100A according to the present example embodiment, with a first conductive member 110 being removed therefrom. FIG. 1C is a plan view showing the structure of FIG. 1B as viewed from the +Z direction. Note that FIGS. 1A through 1C only show a portion of the waveguide device 100A. The same is also true in any of the following example embodiments.

FIGS. 1A through 1C show XYZ coordinates along X, Y and Z directions which are orthogonal to one another. Note that any structure appearing in a figure of the present application is shown in an orientation that is selected for ease of explanation, which in no way should limit its orientation when an example embodiment of the present disclosure is actually practiced. Moreover, the shape and size of a whole or a part of any structure that is shown in a figure should not limit its actual shape and size.

The waveguide device 100A includes a first conductive member 110, a second conductive member 120, a waveguide member 122, and a plurality of rod rows 124X disposed on opposite sides of the waveguide member 122. Each of the plurality of rod rows 124X includes a plurality of conductive rods 124 arranged along the Y direction.

The first conductive member 110 has a first conductive surface 110a extending along a first direction (which in the present example embodiment is the Y direction) and along a second direction (which in the present example embodiment is the X direction) that intersects the first direction. The second conductive member 120 has a second conductive surface 120a opposing the first conductive surface 110a. The first conductive member 110 and the second conductive member 120 in the present example embodiment each have a plate shape. Alternatively, the first conductive member 110 and the second conductive member 120 may each have a block shape.

The waveguide member 122 is located between the first conductive member 110 and the second conductive member 120, and has a structure extending along the first direction (the Y direction). The waveguide member 122 in the present example embodiment has a ridge shape protruding from the second conductive surface 120a of the second conductive member 120. The waveguide member 122 has an electrically-conductive waveguide surface 122a opposing the first conductive surface 110a at its top.

The plurality of rod rows 124X are disposed along the waveguide member 122. The plurality of rod rows 124X flank one another along the second direction (the X direction). Each rod row 124X includes a plurality of conductive rods 124 arranged along the first direction (the Y direction). Each conductive rod 124 has a root connected to the second conductive surface 120a and a leading end opposing the first conductive surface 110a. The plurality of conductive rods 124 function as the aforementioned artificial magnetic conductor.

Neither the waveguide surface 122a of the waveguide member 122 nor the leading end of each conductive rod 124 is in contact with the first conductive surface 110a, but a gap exists therebetween. A waveguide is defined between the first conductive surface 110a and the waveguide surface 122a.

The waveguide device 100A is used in applications where an electromagnetic wave in a predetermined band (referred to as an "operating frequency band") is to be propagated along the waveguide surface 122a. In the present specification, a wavelength in free space of an electromagnetic wave propagating through a waveguide which extends between the first conductive surface 110a and the waveguide surface 122a, corresponding to the center frequency of the operating frequency band, is designated as λo. Moreover, a wavelength in free space of such an electromagnetic wave at the highest frequency of the operating frequency band is designated as λm.

The spacing between the first conductive surface 110a and the second conductive surface 120a is set to less than λm/2. The width (size along the X direction) of the waveguide member 122, the width (size along the X direction and the Y direction) of each conductive rod 124, the width of a gap between two adjacent conductive rods 124 and the width of the gap between the waveguide member 122 and the conductive rods 124 are also set to less than λm/2. This criterion is imposed in order to suppress resonance occurring in the space between the first conductive surface 110a and the second conductive surface 120a, which would hinder the confinement effect of electromagnetic waves.

For example, when a signal wave of 76.5±0.5 GHz (which belongs to the millimeter wave band) propagates in the waveguide, the wavelength of the signal wave is in the range from 3.8934 mm to 3.9446 mm. Since λm equals 3.8934 mm in this case, the spacing between the first conductive member 110 and the second conductive member 120 may be set to a value which is less than a half of 3.8934 mm. So long as the first conductive member 110 and the second conductive member 120 realize such a narrow spacing while being disposed opposite from each other, the first conductive member 110 and the second conductive member 120 do not need to be strictly parallel. Moreover, a whole or a part of the first conductive member 110 and/or the second conductive member 120 may be shaped as a curved surface.

The shape and arrangement of the plurality of conductive rods 124 are not limited to the illustrated example, so long as they exhibit the function of an artificial magnetic conductor. The plurality of conductive rods 124 do not need to be arranged in orthogonal rows and columns; the rows and columns may be intersecting at angles other than 90 degrees. The conductive rods 124 may also vary in shape and size depending on the position on the second conductive member 120. The conductive rods 124 do not need to be of uniform height, but rather the conductive rods 124 may be diverse so long as the array of conductive rods 124 is able to function as an artificial magnetic conductor.

Each conductive rod 124 does not need to have a prismatic shape as shown in the figure, but may have a cylindrical shape, for example. Furthermore, each conductive rod 124 does not need to be constant in width from the root to the leading end. For example, each conductive rod 124 may be shaped so that its width monotonically decreases from the root to the leading end.

The waveguide member 122 according to the present example embodiment has a uniform width and a uniform height along the Y direction. Without being limited to such an implementation, the width and/or the height of the waveguide member 122 may vary along the Y direction. For example, for the purpose of adjusting the phase of an electromagnetic wave that propagates, the height and/or the width of the waveguide surface 122a of the waveguide member 122 may locally vary.

In the present example embodiment, three rod rows 124X exist in each of the +X direction and the −X direction of the waveguide member 122. Each rod row 124X includes eight conductive rods 124. Furthermore, a rod row 124X including three conductive rods 124 is disposed at a gap from the +Y direction end of the waveguide member 122. These seven rod rows 124X in total are arranged at equal intervals along the X direction. Such construction is only an example; the number of rod rows and the number of rods in each rod row, and their arrangement, may depend on the application.

The first conductive member 110 has a plurality of throughholes 116 disposed along the plurality of rod rows 124X. The second conductive member 120 also has a plurality of throughholes 126 disposed along the plurality of rod rows 124X. In the present example embodiment, both of the first conductive member 110 and the second conductive member 120 have a plurality of throughholes. Without being limited such a structure, only one of the conductive members 110 and 120 may have a plurality of throughholes. Moreover, at least one of the plurality of throughholes may be replaced by a bottomed hole(s), i.e., a dent(s). The plurality of throughholes or dents do not need to be disposed along all of the plurality of rod rows 124X, but may be disposed along some of the rod rows 124X. The number of holes possessed by at least one of the first conductive member 110 and the second conductive member 120 may be one. In other words, at least one of the first conductive member 110 and the second conductive member 120 may possess at least one hole that is disposed adjacent to a conductive rod(s) included in the plurality of rod rows 124X.

By providing holes, e.g., throughholes or dents, the first conductive member 110 and/or the second conductive member 120 can be reduced in weight. When the throughholes or dents are provided for this purpose, the achieved level of weight reduction will be independent of the positions of the throughholes or dents. However, when other effects are to be expected, the positions of the throughholes or dents may govern the effect obtained. For example, in the case where the waveguide device is to be used for a microwave chemical reaction device, it is preferable to provide one or more throughholes at a position(s) that is adjacent to the waveguide member 122 or on the waveguide member 122. The reason is that the electromagnetic wave intensity is highest near the waveguide member 122, where a raw material substance to be supplied through the throughhole(s) will be subjected to that strong electromagnetic wave and thus efficiently undergo a reaction. On the other hand, in the case where holes, e.g., throughholes or dents, are to be provided for use in the positioning of the first conductive member 110 or the second conductive member 120, it is more preferable to dispose the hole(s) at a position(s) that is distanced from the waveguide member 122 by one rod row. In other words, as viewed from a third direction (which in the present example embodiment is the Z direction), a hole(s), e.g., a throughhole(s) or dent(s), may be disposed in such a manner that the center of its opening is located between a first type of rod row that is adjacent to the waveguide member 122 and a second type of rod row that is adjacent to the first type of rod row. Such an arrangement will greatly lower the electromagnetic wave intensity at the position(s) of the throughhole(s) or dent(s), so that the throughhole(s) or dent(s) will exert less influence on the waveguide characteristics. In addition, since it may be only one rod row that exists between the waveguide member 122 and the throughhole(s) or dent(s), the dimensions of the waveguide device can be designed to be small. FIG. 1C shows a relative positioning of the second conductive member 120, the waveguide member 122, the plurality of throughholes 126, and the plurality of rod rows 124X as viewed along the third direction (which in the present example embodiment is the Z direction) that is perpendicular to both the first and second directions. The plurality of throughholes 126 form rows both along the X direction and along the Y direction. Moreover, each of the plurality of rod rows 124X includes a plurality of conductive rods 124 arranged along the Y direction. Therefore, also the plurality of conductive rods 124 form rows both along the X direction and along the Y direction. In the present example embodiment, overlap between the rows of throughholes 126 and the rows of conductive rods 124 occurs along neither the X direction nor the Y direction. In other words, in this arrangement, rows of throughholes 126 are located where rows of conductive rods 124 do not exist. By adopting such an arrangement, even if a multitude of throughholes 126 are provided, the mechanical strength of the second conductive member 120 can be kept relatively high.

Although not shown in FIG. 1C, as viewed along the Z direction, the plurality of throughholes 116 in the first conductive member 110 are located in the same positions as the plurality of throughholes 126 in the second conductive member 120. As viewed along the Z direction, each of the centers of the plurality of throughholes 116 and 126 is in a position that overlaps neither the waveguide member 122 nor any conductive rod 124. More specifically, centers of many of the plurality of throughholes 116 and 126 are located between four mutually-adjacent conductive rods 124, as viewed along the Z direction. Without being limited to such an implementation, as viewed along the third direction, some of the plurality of throughholes 116 and 126 may overlap the waveguide member 122 or the conductive rods 124.

In the case where the conductive members 110 and 120 are produced by a method such as a die casting method or an injection molding method, for example, in which a material in a fluid state is injected into a hollow space created by one or more dies, by adopting the above arrangement of the holes, the quality of the product may be improved. That is because by disposing the center of each hole at a position different from a position directly below one of the conductive rods, the material in the fluid state can be easily flown into the portion in the hollow space in which the conductive rods are shaped. Alternatively, the center of each hole may be located between two adjacent conductive rods among the conductive rods constituting the first type of rod row or the second type of rod row. With such structure, too, similar effects can be obtained.

Nonetheless, at least some of the plurality of throughholes 116 and 126 are to be disposed at positions which overlap neither the waveguide member 122 nor any gap between the waveguide member 122 and a rod row 124X that is adjacent to the waveguide member 122, as viewed along the third direction.

The plurality of conductive rods 124 according to the present example embodiment are disposed in rows and columns along the X direction and along the Y direction. The plurality of throughholes 116 and 126 are also disposed in rows and columns along the X direction and along the Y direction. In the present example embodiment, the number of rows of conductive rods 124 is eight, and the number of columns of conductive rods 124 is seven, whereas the number of rows of throughholes 116, 126 is seven, and the number of columns of throughholes 116, 126 is six. However, this is only an example. The numbers of rows and the numbers of columns are to be set to the most appropriate numbers depending on the application.

In the present example embodiment, the plurality of conductive rods 124 and the plurality of throughholes 116 and 126 are disposed along the X direction (first direction) and along the Y direction (second direction) with constant periods; however, these periods do not need to be constant. In the case where the plurality of conductive rods 124 in each rod row 124X are disposed with a first period along the Y direction, the plurality of throughholes 116 and 126 may also be disposed with the first period along the Y direction. The plurality of conductive rods 124 and the plurality of throughholes 116 and 126 may be disposed along the X direction with a second period. The second period may or may not be equal to the first period.

In the present example embodiment, the shape of each of the plurality of throughholes 116 and 126 as viewed along the third direction is a rounded square shape. The length s of one side thereof is about ⅛ of the free space wavelength $\lambda o$ of an electromagnetic wave at the center frequency of the frequency band used. However, such a shape and dimensions are not limitations. The shape of each throughhole 116, 126 as viewed along the third direction may be any of various shapes such as a circle, an ellipse, a polygon, or a rounded polygon, for example. The size of each throughhole 116, 126 can also be freely set unless functionality or durability is affected. However, the width of the opening of each throughhole is set to a value which is smaller than the interval between the centers of two adjacent conductive rods 124 that are the closest to that throughhole. As used herein, the "opening" of a throughhole means a portion of the throughhole that can be regarded as being in the same plane as the first conductive surface 110a or the second conductive surface 120a. The "width of an opening" means the length of a straight line or non-straight line that passes through the center of the opening and connects between both ends of the opening. Hereinafter, with reference to FIG. 1D, an example of "the width of an opening" will be described.

Figure 1D:
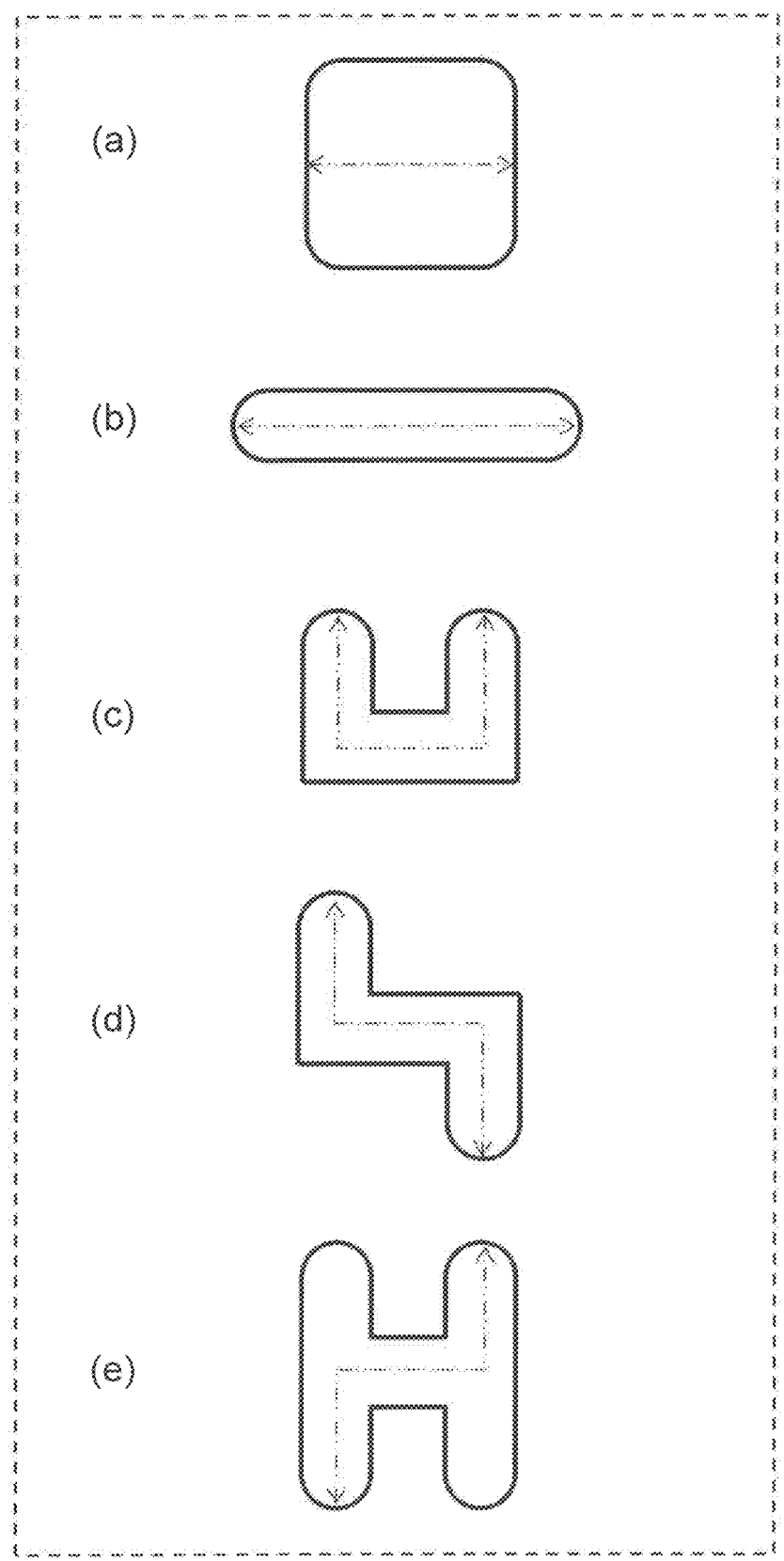
FIG. 1D is a diagram showing exemplary shapes of a throughhole.

FIG. 1D shows several example shapes of the opening of a throughhole. In FIG. 1D, (a) shows the opening of a throughhole having a rounded square shape; (b) shows the opening of a throughhole having a linear shape; (c) shows an exemplary throughhole having a U-shaped opening; and (d) shows an exemplary throughhole having a Z-shaped opening. In FIG. 1D, the example throughholes of (c) and (d) each include a pair of parallel linear portions and another linear portion that connects between the ends thereof. In FIG. 1D, (e) shows an exemplary throughhole having an H-shaped opening. This exemplary throughhole includes a pair of parallel linear portions (also referred to as "vertical portions") and another linear portion (also referred to as a "lateral portion") that connects between the central portions of the pair of linear portions. Thus, the shape of the opening of each throughhole used in example embodiments of the present disclosure may be various.

In (a) through (e) of FIG. 1D, the opening of the width of each throughhole is indicated with a double-headed arrow. As shown in (a) of FIG. 1D, when the shape of the opening of the throughhole is near rectangular, the length of a longer side thereof corresponds to the "width" of the opening. As shown in (b) of FIG. 1D, when the shape of the opening of the throughhole is near elliptical, the length of its major axis corresponding to the "width" of the opening. As shown in (c) through (e) of FIG. 1D, when the opening of the throughhole consists of a combination of a plurality of linear portions, the largest of the lengths between one end to the other end of the opening along the center lines of the linear portions corresponds to the "width" of the opening.

The shape, dimensions, and position of each throughhole 116 of the first conductive member 110 are set to a shape, dimensions, and a position which will not allow the throughhole 116 to function as a slot (i.e., an antenna element). In other words, the shape, dimensions, and position of each throughhole 116 are to be designed so as not to hinder propagation of an electromagnetic wave that is propagating along the waveguide surface 122a of the waveguide member 122. If any one of the throughholes 116 that are the closest to the waveguide member 122 has a planar shape which is longer along the Y direction than along the X direction and is located in a position opposing the edge of the waveguide surface 122a or a vicinity thereof, that throughhole 116 may function as a slot, i.e., an antenna element. In that case, a loss in the electromagnetic energy propagating along the waveguide surface 122a may occur. Therefore, each throughhole 116 in the present example embodiment is to be designed so as not to satisfy the conditions for functioning as an antenna element. For example, each throughhole 116 is designed so as to have a dimension (e.g., side length, or diameter) that is smaller than $\lambda_o/2$.

In the case where the waveguide device 100A is used for transmission of a millimeter wave, the frequency used is approximately not less than 30 GHz and not more than 300 GHz, and $\lambda_o$ is approximately not less than 1 mm and not more than 10 mm. In that case, the dimensions of each throughhole 116, 126 along the Y direction and the X direction may be set to e.g. less than 0.5 mm, and typically less than 0.25 mm. In the case where the electromagnetic wave used is a terahertz wave, these dimensions will be even smaller.

Note that the +Z direction surface of the first conductive member 110 and the inner wall surface of each throughhole 116 do not need to be electrically conductive. Similarly, the −Z direction surface of the second conductive member 120 and the inner wall surface of each throughhole 126 do not need to be electrically conductive.

In the present example embodiment, as viewed along the Z direction, the plurality of throughholes 116 in the first conductive member 110 are disposed so as to overlap the plurality of throughholes 126 in the second conductive member 120, or vice versa. However, the present disclosure is not limited to such a structure. Alternatively, as viewed along the third direction, the plurality of throughholes 116 in the first conductive member 110 and the plurality of throughholes 126 in the second conductive member 120 may partially overlap, or not overlap at all.

In the present example embodiment, the plurality of throughholes 126 in the second conductive member 120 are disposed where neither the waveguide member 122 nor the plurality of conductive rods 124 are disposed. Without being limited to such a structure, as in Example embodiments 3 and 4 described below, for example, the plurality of throughholes 126 may include one or more throughholes each of which extends through the second conductive member 120 and through the waveguide member 122 or one of the conductive rods 124.

The plurality of throughholes 116 and 126 contribute to weight reduction of the waveguide device 100A. Therefore, a device (e.g., an antenna device) that includes the waveguide device 100A according to the present example embodiment may be reduced in weight. Moreover, the plurality of throughholes 116 and 126 also provide a heat dissipation effect. Therefore, a heat that is generated from an electronic circuit (e.g. a microwave integrated circuit) that is connected to the waveguide device 100A, for example, can be effectively released. Furthermore, these throughholes 116 and 126 allow a liquid or other fluids to be supplied into the space between the first conductive member 110 and the second conductive member 120. As will be described later, this will allow the waveguide device 100A to be utilized in various applications, e.g., a microwave chemical reaction device or a terahertz spectroscopic analysis device, for example. Furthermore, it also becomes possible to clean in between the first conductive member 110 and the second conductive member 120 by using water or other wash solutions. Thus, the waveguide device 100A may be installed in an environment where it is liable to contamination, e.g., outdoors.

Example Embodiment 2

Figure 2A:
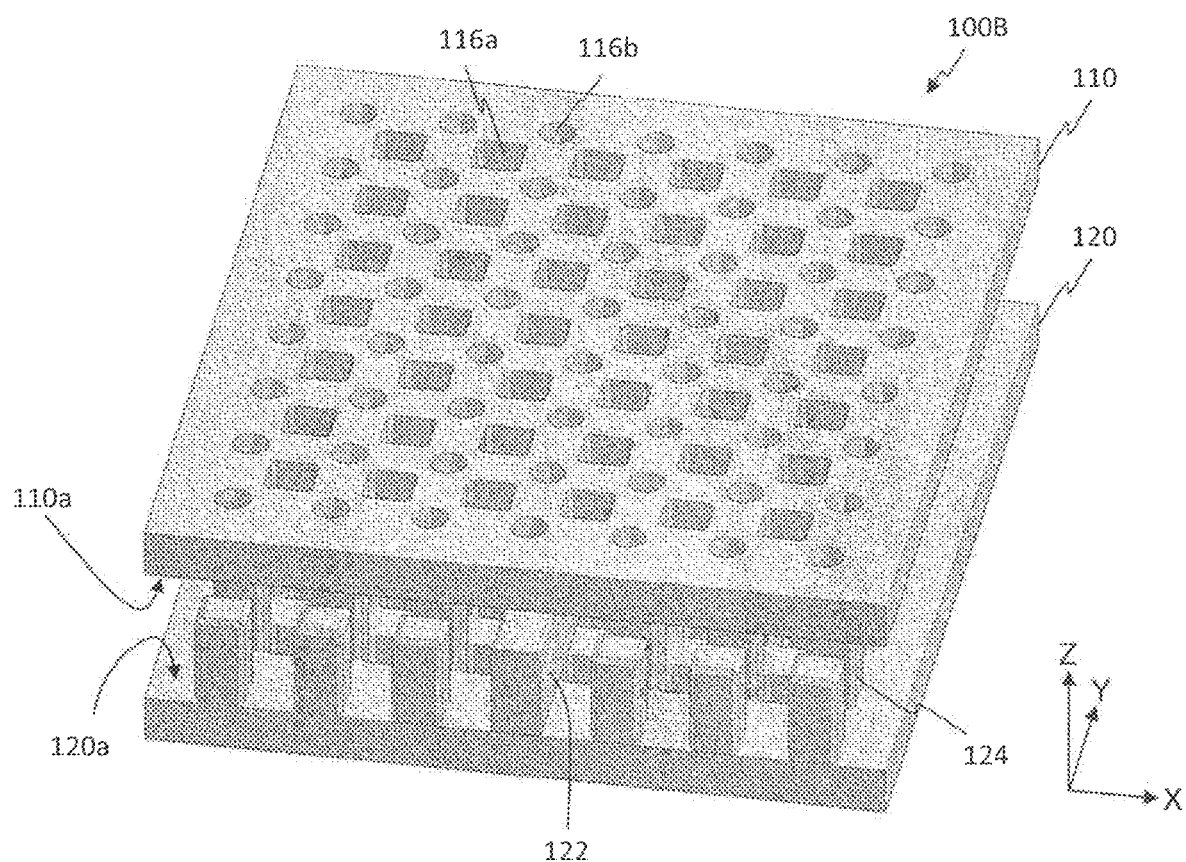
FIG. 2A is a perspective view showing a waveguide device according to a second example embodiment of the present disclosure.
Figure 2B:
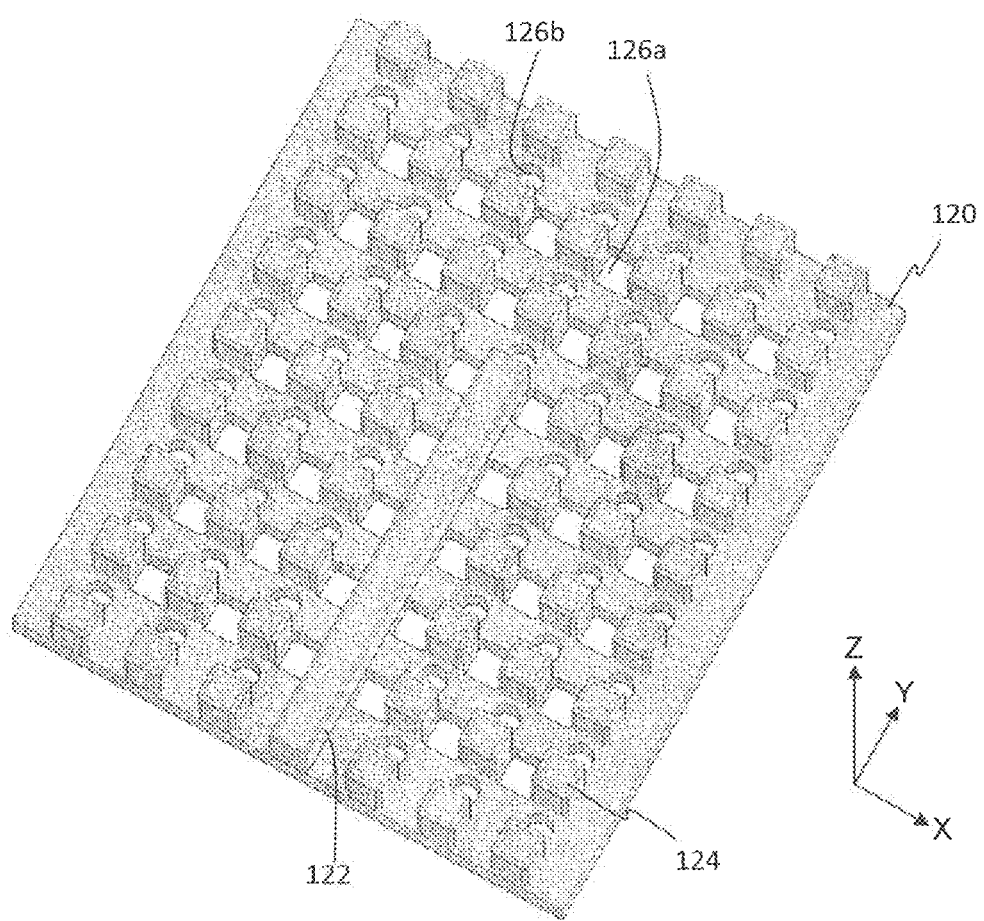
FIG. 2B is a perspective view showing the structure of the waveguide device according to the second example embodiment of the present disclosure, with a first conductive member being removed therefrom.
Figure 2C:
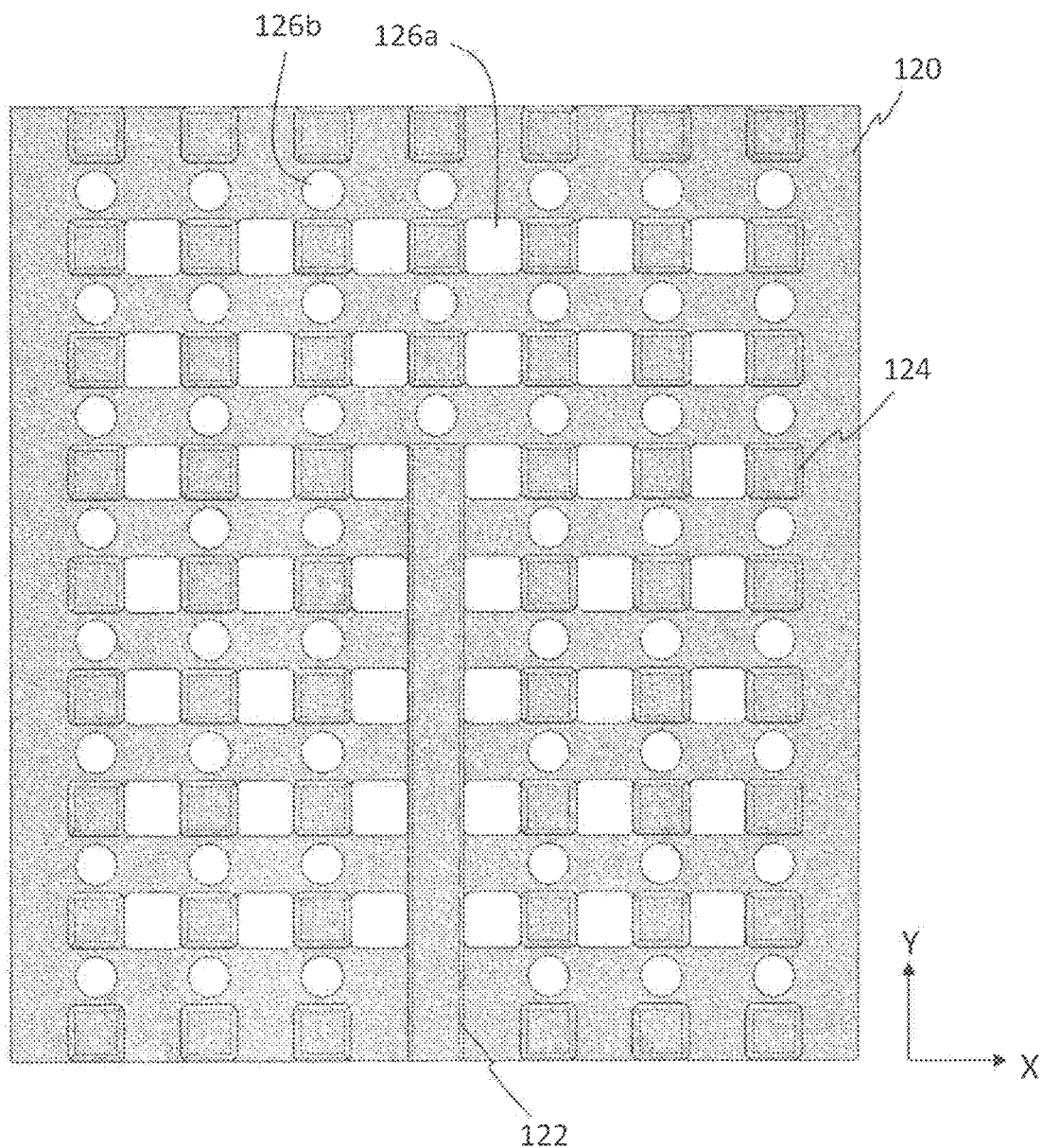
FIG. 2C is a plan view showing the structure of the waveguide device according to the second example embodiment of the present disclosure, with the first conductive member being removed therefrom.

FIG. 2A is a perspective view showing a waveguide device 100B according to an illustrative second example embodiment of the present disclosure. FIG. 2B is a perspective view showing the structure of the waveguide device 100B, with a first conductive member 110 being removed therefrom. FIG. 2C is a plan view showing the structure of the waveguide device 100B, with the first conductive member 110 being removed therefrom.

The present example embodiment differs from Example Embodiment 1 with respect to the number and arrangement of throughholes in the first conductive member 110 and the second conductive member 120. In the present example embodiment, the first conductive members 110 includes: a plurality of throughholes 116a each having a planar shape which is essentially rectangular; and a plurality of throughholes 116b each having a planar shape which is essentially circular. Each rectangular throughhole 116a in the first conductive member 110 is located among four adjacent circular throughholes 116b. Some of the plurality of throughholes 116b are located in positions opposing the waveguide surface of the waveguide member 122.

As shown in FIG. 2B and FIG. 2C, the second conductive member 120 also includes: a plurality of throughholes 126a each having a planar shape which is essentially rectangular; and a plurality of throughholes 126b each having a planar shape which is essentially circular. Each rectangular throughhole 126a is located between two adjacent conductive rods 124 neighboring along the X direction, or between the waveguide member 122 and an adjacent conductive rod 124 neighboring along the X direction. Each circular throughhole 126b is located between two adjacent conductive rods 124 neighboring along the Y direction. Such construction allows the holes to be in an expanded area, as compared to the second conductive member 120 in Example Embodiment 1. As viewed along the Z direction, the rectangular throughholes 116a in the first conductive member 110 overlap the rectangular throughholes 126a in the second conductive member 120, whereas the circular throughholes 116b in the first conductive member 110 overlap the circular throughholes 126b in the second conductive member 120.

In the present example embodiment, the first conductive member 110 has a plurality of circular throughholes 116b opposing the waveguide surface 122a of the waveguide member 122. The diameter of these throughholes 116b is sufficiently smaller than ½ of the free space wavelength $\lambda_o$ of an electromagnetic wave propagating through the waveguide, e.g., smaller than ⅛ of $\lambda_o$. Even when such throughholes 116b are disposed, an electromagnetic wave will propagate along the waveguide member 122, without leaking to the outside through the throughholes 116*b*.

Example Embodiment 3

Figure 3A:
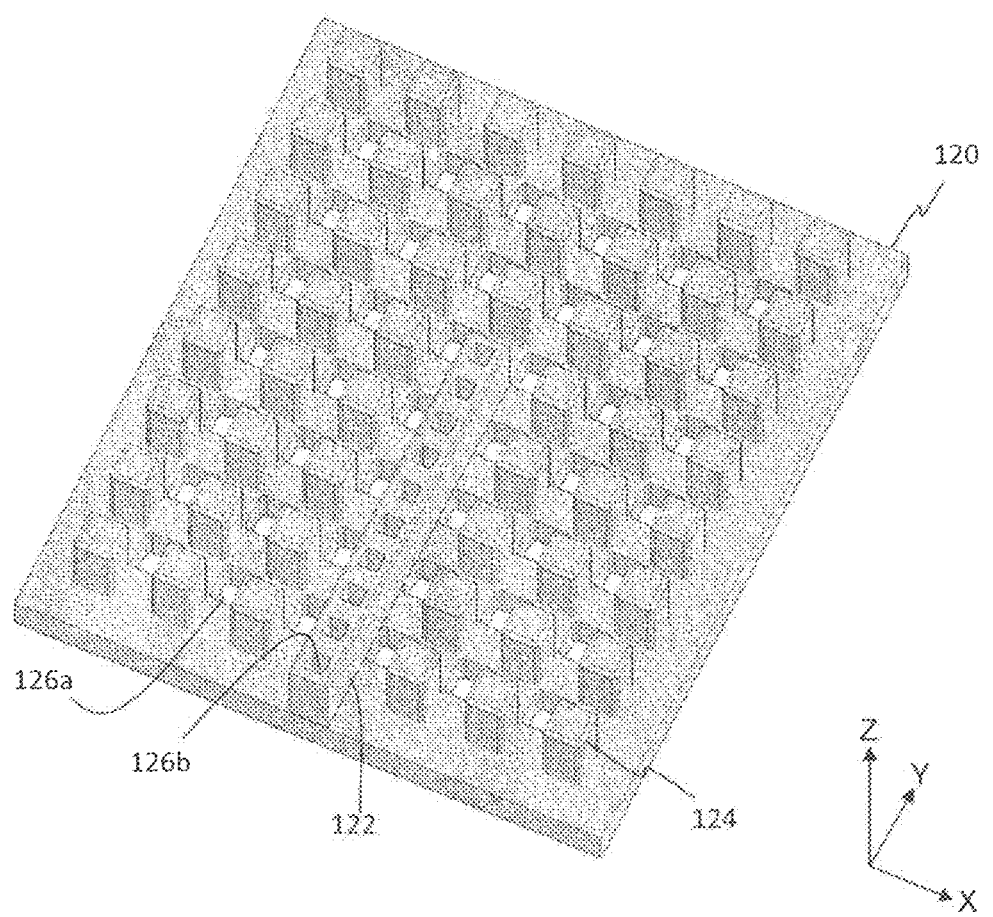
FIG. 3A is a perspective view showing the structure of a waveguide device according to a third example embodiment of the present disclosure, with a first conductive member being removed therefrom.
Figure 3B:
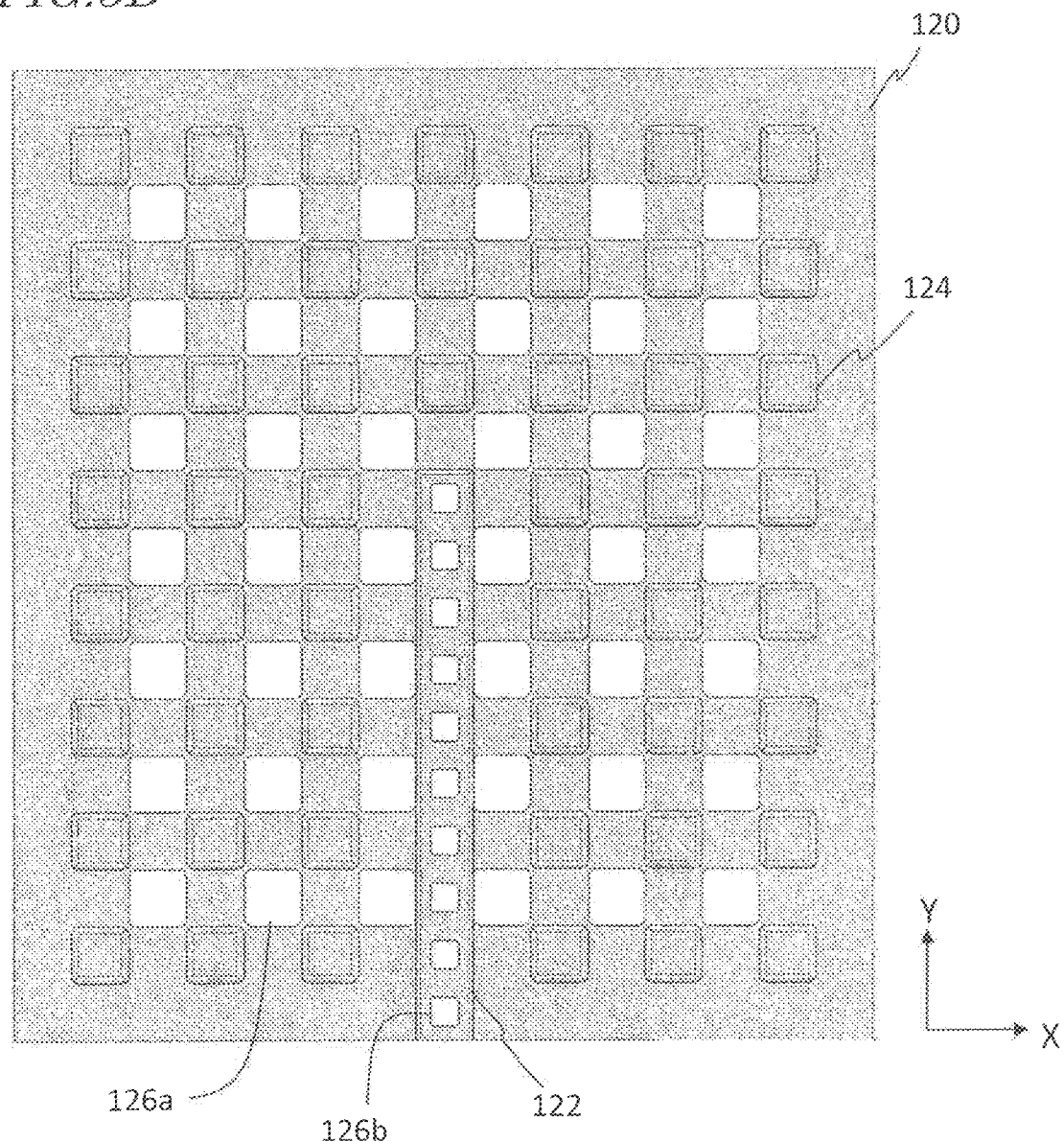
FIG. 3B is a plan view showing the structure of the waveguide device according to the third example embodiment of the present disclosure, with the first conductive member being removed therefrom.

FIG. 3A is a perspective view showing a second conductive member 120 of a waveguide device according to an illustrative third example embodiment of the present disclosure. FIG. 3B is a plan view showing a second conductive member 120 according to the present example embodiment. Although not shown, the first conductive member 110 according to the present example embodiment is identical in structure to the first conductive member 110 according to the first example embodiment. Instead, the first conductive member 110 may be similar in structure to the first conductive member 110 according to the second example embodiment.

In addition to a plurality of throughholes 126*a* which are disposed in the same positions as the plurality of throughholes 126 in the first example embodiment, the second conductive member 120 according to the present example embodiment includes a plurality of throughholes 126*b* extending through the second conductive member 120 and the waveguide member 122. These throughholes 126*b* each have a square shape the length of whose one side is smaller than the width of the waveguide surface of the waveguide member 122 as viewed along the Z direction. Without being limited to a square shape, the planar shape of each such throughhole 126*b* may be other shapes, e.g., a circle. Providing such throughholes 126*b* allows the phase of an electromagnetic wave propagating along the waveguide member 122 to be adjusted. Instead of such throughholes 126*b*, a plurality of dents or bumps may be provided on the waveguide surface. Similar phase adjustments are also possible in that case.

Example Embodiment 4

Figure 4A:
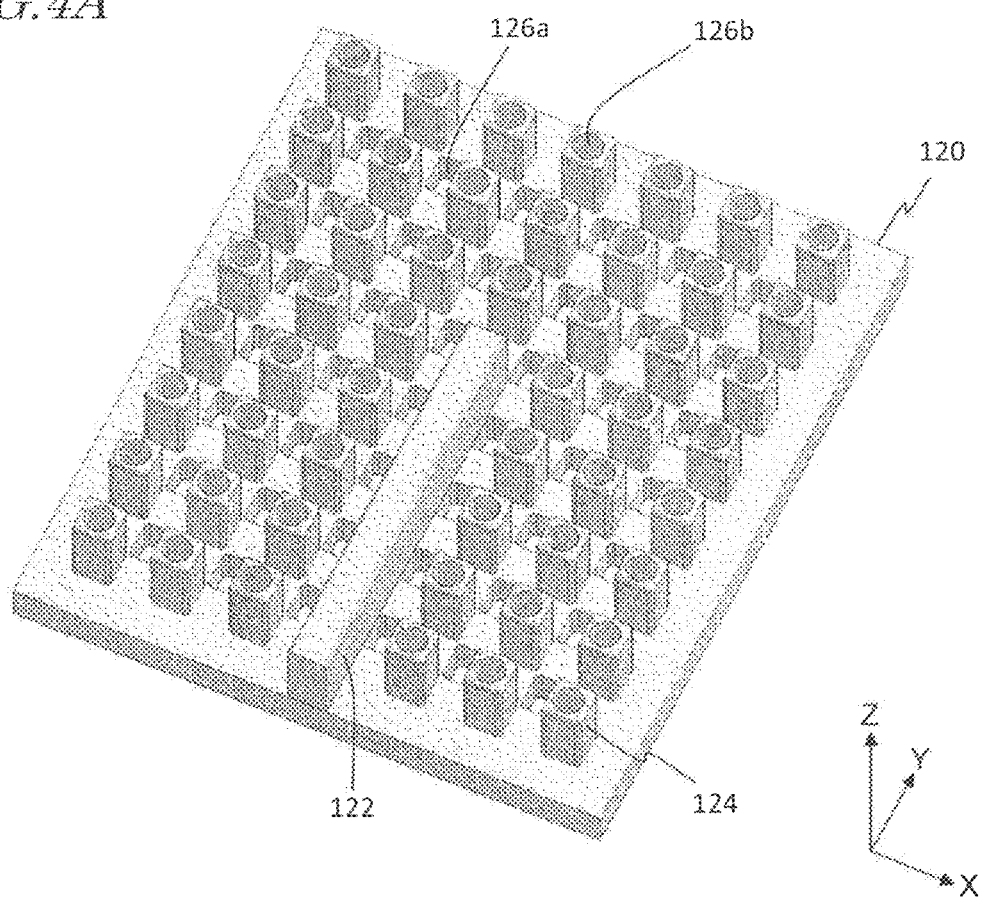
FIG. 4A is a perspective view showing the structure of a waveguide device according to a fourth example embodiment of the present disclosure, with a first conductive member being removed therefrom.
Figure 4B:
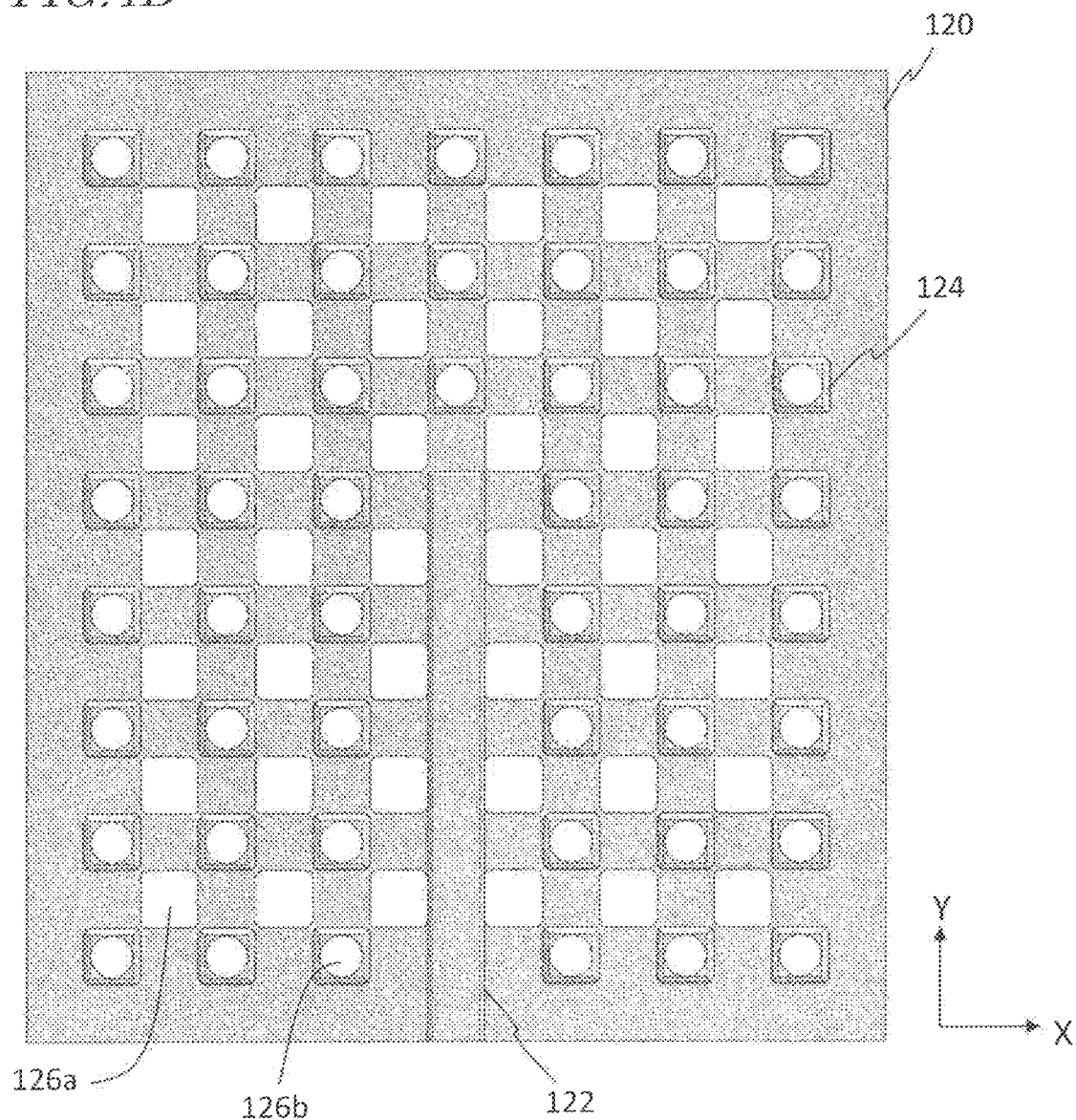
FIG. 4B is a plan view showing the structure of the waveguide device according to the fourth example embodiment of the present disclosure, with the first conductive member being removed therefrom.

FIG. 4A is a perspective view showing a second conductive member 120 of a waveguide device according to an illustrative fourth example embodiment of the present disclosure. FIG. 4B is a plan view showing the second conductive member 120 according to the present example embodiment. Although not shown, the first conductive member 110 according to the present example embodiment is identical in structure to the first conductive member 110 according to the first example embodiment. Instead, the first conductive member 110 may be similar in structure to the first conductive member 110 according to the second example embodiment.

In addition to a plurality of throughholes 126*a* which are disposed in the same positions as the plurality of throughholes 126 in the first example embodiment, the second conductive member 120 according to the present example embodiment includes a plurality of throughholes 126*b* respectively extending through the plurality of conductive rods 124. As viewed along the Z direction, these throughholes 126*b* each have a circular shape whose diameter is smaller than the width of each conductive rod 124. Such construction allows the holes to be in an expanded area, as compared to the conductive member 120 in Example Embodiment 2. Even with such throughholes 126*b* formed therein, the plurality of conductive rods 124 function as an artificial magnetic conductor. Therefore, the aforementioned effects can be attained without undermining the waveguide functionality.

In addition to the construction of the present example embodiment, one or more throughholes extending through the waveguide member 122 may further be provided as in Example Embodiment 3. Moreover, only throughholes 126*b* extending through the conductive rods 124 may be provided, without any throughholes 126*a* being provided that are adjacent to the conductive rods 124.

Example Embodiment 5

Figure 5:
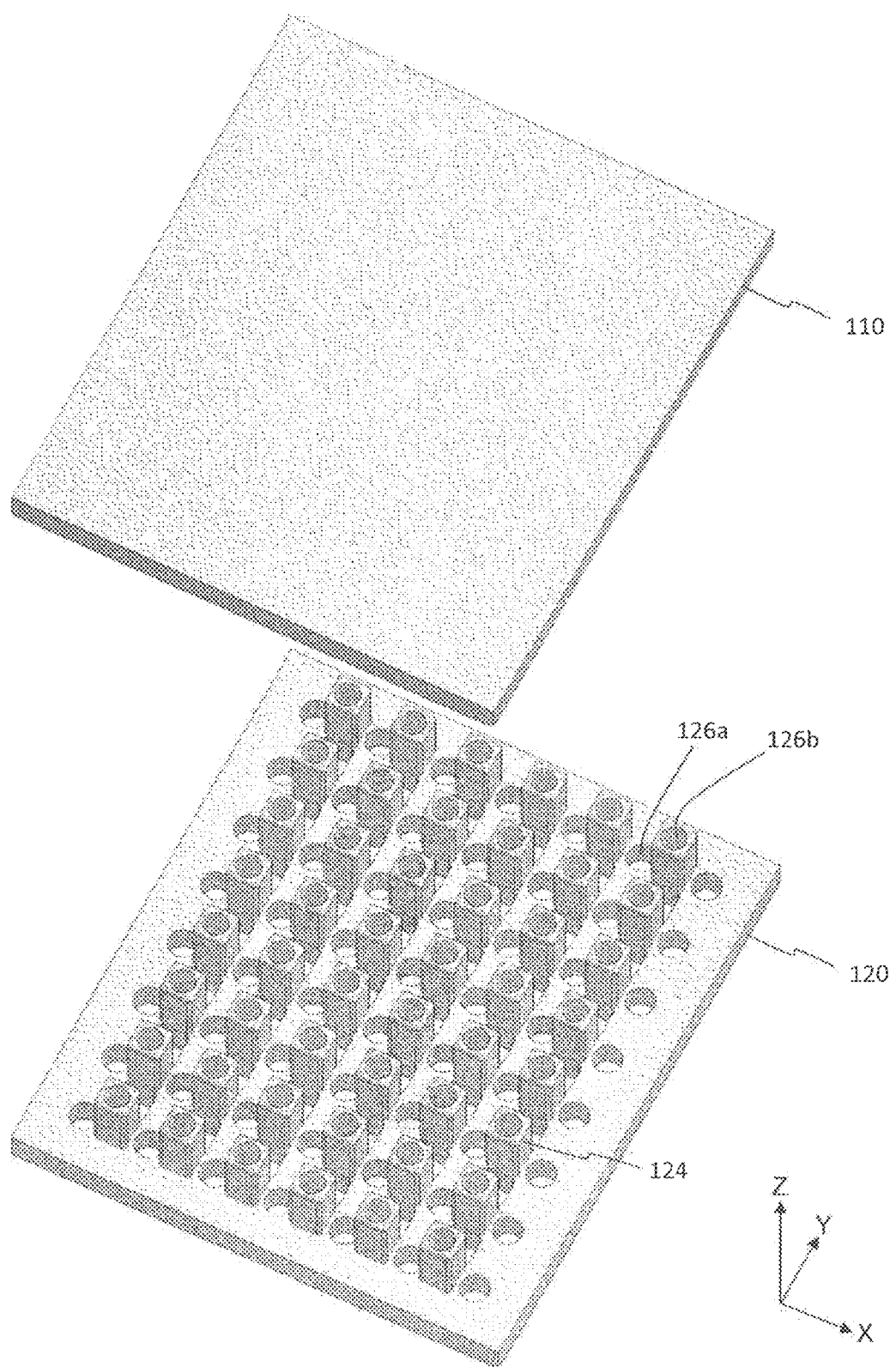
FIG. 5 is a perspective view showing an electromagnetic radiation confinement device according to a fifth example embodiment of the present disclosure.

FIG. 5 is a perspective view schematically showing the construction of an electromagnetic radiation confinement device according to an illustrative fifth example embodiment of the present disclosure. Although the electromagnetic radiation confinement device according to the present example embodiment is similar in structure to the waveguide devices described above, it lacks a waveguide member. For ease of understanding, the spacing between the first conductive member 110 and the second conductive member 120 is exaggerated in FIG. 5. In actual use, the spacing between the first conductive member 110 and the second conductive member 120 is kept at a value which is less than ½ of the free space wavelength of the electromagnetic wave used.

The first conductive member 110 according to the present example embodiment has no throughholes. On the other hand, the second conductive member 120 has a plurality of throughholes 126*a* and 126*b* which are disposed in rows and columns along the plurality of conductive rods 124. The plurality of throughholes 126*a* are disposed respectively adjacent to the conductive rods 124, whereas the plurality of throughholes 126*b* extend respectively through the conductive rods 124 and through the second conductive member 120. In the present example embodiment, each throughhole 126*a*, 126*b* has a planar shape which is circular.

To the electromagnetic radiation confinement device according to the present example embodiment, a radio-frequency electromagnetic wave is supplied from the outside. As used herein, a radio frequency (RF) means a frequency of 10 kHz or above. The electromagnetic radiation confinement device has a waffle iron structure that confines electromagnetic energy of radio frequencies. The plurality of conductive rods 124 function as an artificial magnetic conductor. Therefore, the energy of supplied electromagnetic waves is confined between the first conductive member 110 and the second conductive member 120.

In the present example embodiment, the second conductive member 120 has the throughholes 126*a* and 126*b*. Instead of the second conductive member 120, the first conductive member 110 may have one or more throughholes. Alternatively, both of the first conductive member 110 and the second conductive member 120 may have one or more throughholes. Instead of throughholes, bottomed holes may be provided in the first conductive member 110 or the second conductive member 120. As viewed along the Z direction, at least one of the first conductive member 110 and the second conductive member 120 may be configured to have at least one hole disposed at a position(s) located between two adjacent conductive rods 124 and opposing the conductive surface of the second conductive member 120 or the conductive surface of the first conductive member 110, or at a position(s) overlapping one or more of the conductive rods 124. The width of the opening of the at least one hole may be set to a value which is smaller than the interval between the centers of two adjacent conductive rods that are the closest to that hole. The at least one hole may include a hole, the center of which is located between two adjacent conductive rods among the plurality of conductive rods 124, or located among four mutually-adjacent conductive rods included in the plurality of rod rows as viewed along the z direction (i.e., the third direction).

Other Example Embodiments

In waveguide devices according to example embodiments of the present disclosure, at least one of the first conductive member 110 and the second conductive member 120 has one or more throughholes. Via these throughholes, a fluid, e.g., a liquid or a gas, can be supplied into the space between the first conductive member 110 and the second conductive member 120. Thus, the waveguide device can be utilized in a microwave chemical reaction device, for example.

A microwave chemical reaction device is a device which irradiates a raw material with a microwave so as to heat the raw material, thus promoting a chemical reaction. Microwave chemical reaction devices have the advantages of being able to heat a raw material in a relatively short period of time, achieve uniform heating, etc., and are expected to find their use in various chemical reactions.

Figure 6:
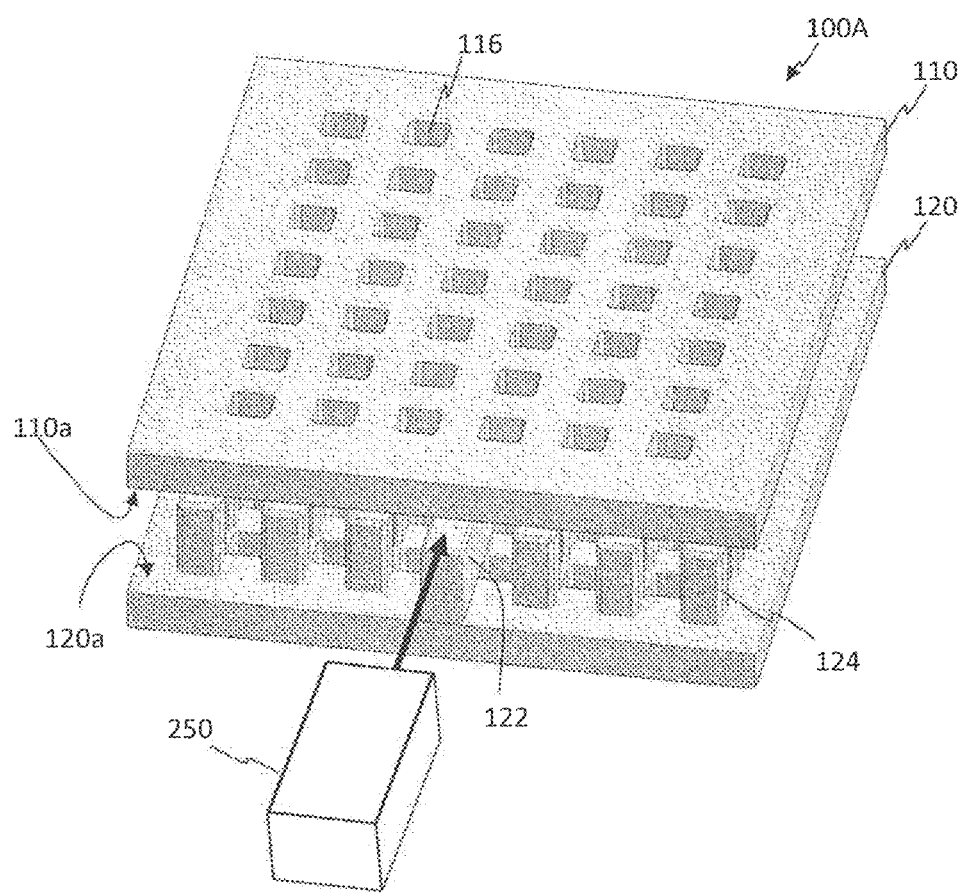
FIG. 6 is a schematically showing an exemplary construction of a microwave chemical reaction device.

A microwave chemical reaction device would include a waveguide device according to any of the above example embodiments and a microwave generator that is connected to the waveguide device. FIG. 6 schematically shows an exemplary construction of a microwave chemical reaction device. This microwave chemical reaction device includes the waveguide device 100A according to Example Embodiment 1 and a microwave generator 250. The microwave generator 250 may include a radio frequency oscillator. As the radio frequency oscillator, a cavity magnetron or klystron can be used, for example. The radio frequency oscillator is connected to the waveguide device 100A, and supplies a microwave to the WRG waveguide extending between the waveguide surface 122a of the waveguide member 122 and the conductive surface 110a of the first conductive member 110. The radio frequency oscillator may be directly connected to the WRG waveguide, or connected to the WRG waveguide via another waveguide.

The first conductive member 110 and the second conductive member 120 may be disposed inside the reaction chamber. Alternatively, the first conductive member 110 and the second conductive member 120 may be utilized as part of the reaction chamber. Via the plurality of throughholes, a solution of raw material may be supplied to the space between the first conductive member 110 and the second conductive member 120. The radio frequency oscillator supplies a microwave to the WRG waveguide. The microwave which has propagated in the WRG waveguide heats the raw material, thus promoting a chemical reaction. In order to further promote the reaction, the microwave chemical reaction device may additionally include an agitator (e.g., with an impeller) for causing circulation of the solution between the first conductive member 110 and the second conductive member 120.

Without being limited to applications utilizing microwaves, a waveguide device and an electromagnetic radiation confinement device according to the present disclosure can also be used in applications utilizing terahertz waves, for example. A terahertz wave has a higher frequency (approximately from 300 GHz to 3 THz) than does a microwave. A terahertz wave may be utilized in spectroscopy, for example. For instance, a waveguide device according to an example embodiment of the present disclosure can be used in a spectroscopic analysis device which utilizes terahertz waves. Such an analysis device would include the aforementioned waveguide device, a terahertz wave source (e.g., a femtosecond laser) that is connected to the waveguide device, and a detector that detects the terahertz wave. The gas or liquid for analysis is supplied to the space between the first conductive member 110 and the second conductive member 120 of the waveguide device.

In the example embodiments of the present disclosure described above, at least one of the first conductive member and the second conductive member has a plurality of throughholes. In an example embodiment of the present disclosure, instead of throughholes, a dent(s), i.e., a bottomed hole(s), may be adopted. In other words, in the above-described example embodiments of the present disclosure, some or all of the plurality of throughholes may be replaced with a dent(s), i.e., a bottomed hole(s), that open in the conductive surface, and a waveguide device or an electromagnetic radiation confinement device can still be realized. Similarly in the below-described examples, throughholes can be replaced by bottomed holes.

Next, an example embodiment of an antenna device will be described.

An antenna device according to an example embodiment of the present disclosure includes: the aforementioned waveguide device; and one or more antenna elements that couple to a waveguide extending between the waveguide surface of a conductive member of the waveguide device and the conductive surface of the first conductive member. Hereinafter, as an example of the antenna device, a slot array antenna including a plurality of slots as a plurality of antenna elements will be described.

Figure 7A:
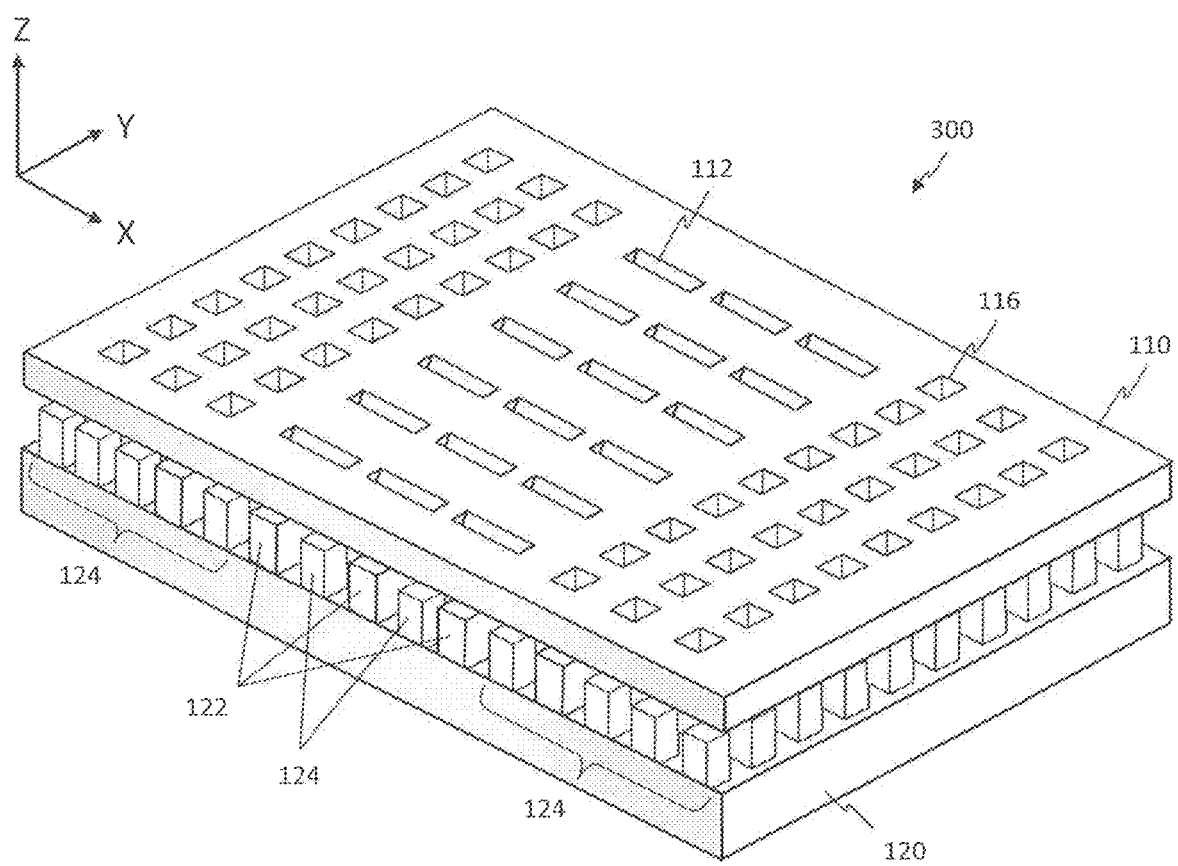
FIG. 7A is a perspective view schematically showing slot the construction of a slot array antenna 300 according to an example embodiment of the present disclosure.
Figure 7B:
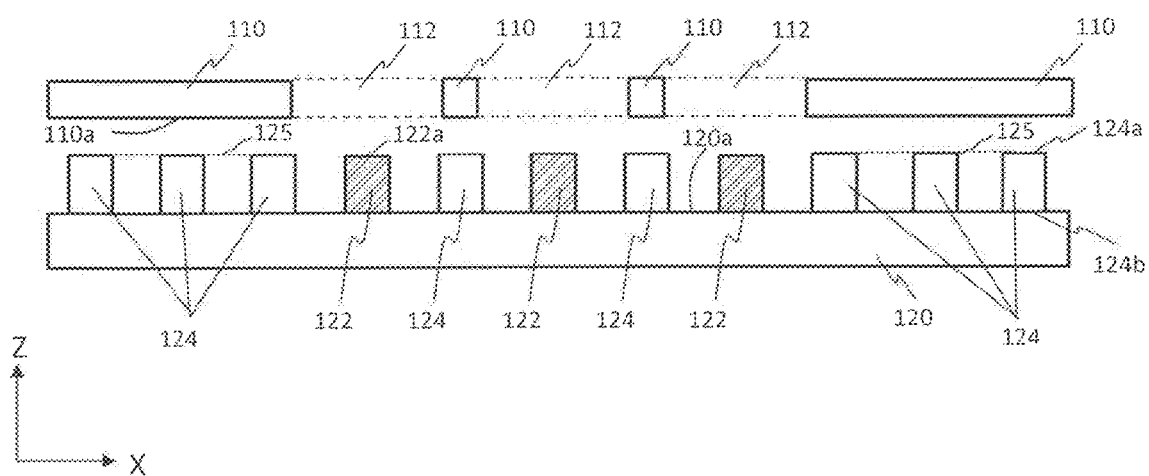
FIG. 7B is a diagram schematically showing a partial cross section of the slot array antenna 300 shown in FIG. 7A, as taken parallel to an XZ plane which passes through the centers of three slots 112 arranged along the X direction.

FIG. 7A is a perspective view schematically showing the construction of a slot array antenna 300 according to an illustrative example embodiment. FIG. 7B is a diagram schematically showing a partial cross section of the slot array antenna 300, as taken parallel to an XZ plane which passes through the centers of three slots 112 arranged along the X direction.

Figure 7C:
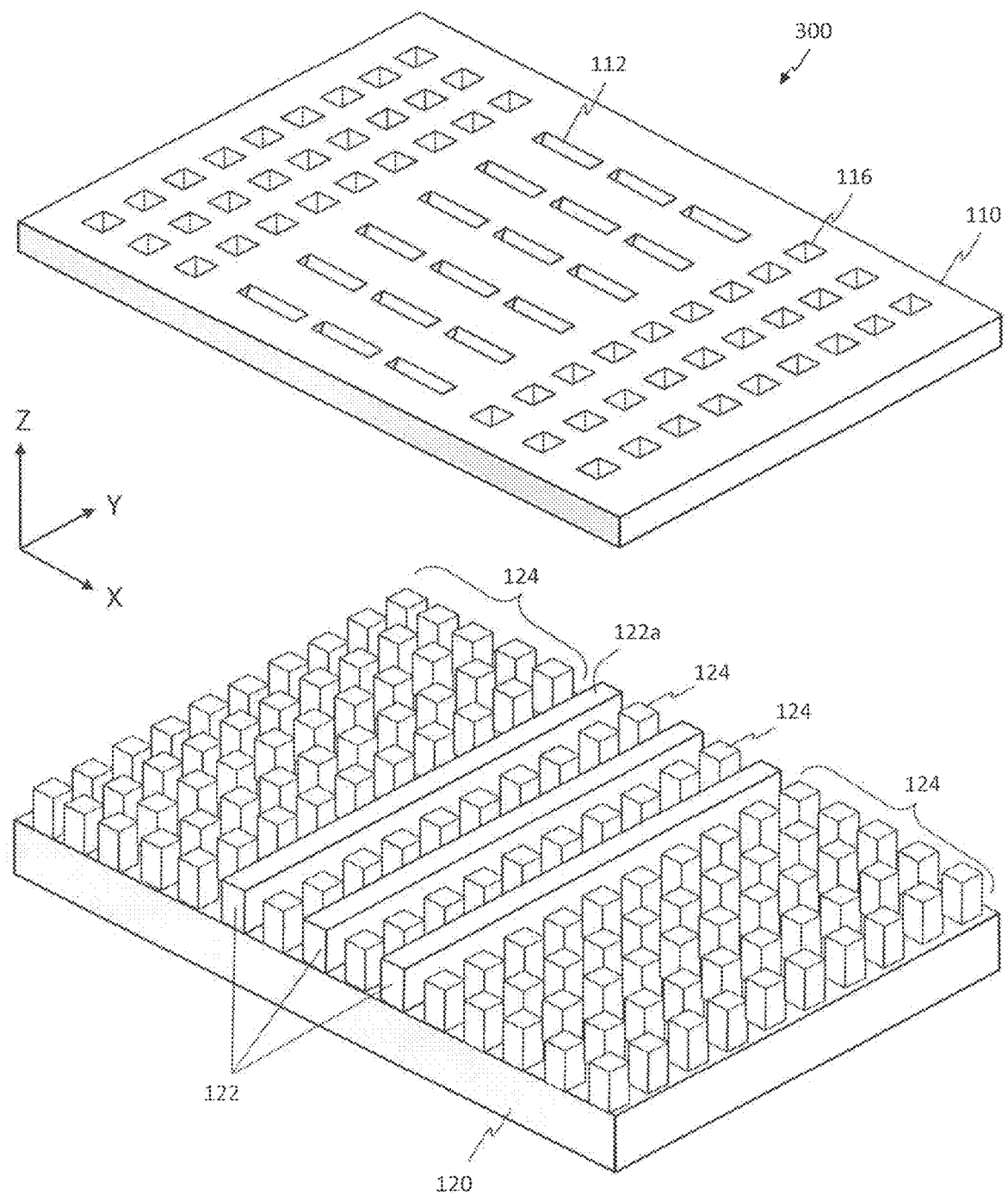
FIG. 7C is a perspective view schematically showing a slot array antenna 300, in which the spacing between a first conductive member 110 and a second conductive member 120 is exaggerated.

FIG. 7C is a perspective view schematically showing the slot array antenna 300, where the spacing between the first conductive member 110 and the second conductive member 120 is exaggerated for ease of understanding. In the actual slot array antenna 300, as shown in FIG. 7A and FIG. 7B, the spacing between the first conductive member 110 and the second conductive member 120 is narrow, and the first conductive member 110 is disposed so as to cover the conductive rods 124 on the second conductive member 120.

The first conductive member 110 according to the present example embodiment includes three slot rows and a plurality of throughholes 116 disposed around them. Each slot row includes a plurality of slots 112 arranged along the Y direction. On the second conductive member 120, three waveguide members 122 and a plurality of conductive rods 124 are disposed. The second conductive member 120 does not have any throughholes.

In the present example embodiment, the number of rows of conductive rods 124 between adjacent waveguide members 122 is small: there is only one row. Therefore, as compared to a construction in which two or more rows of conductive rods 124 are disposed between two adjacent waveguide members 122, the interval(s) between the plurality of waveguide members 122 and the slot interval along the X direction can be reduced. As a result of this, along the X direction, the directions in which grating lobes may occur in the slot array antenna 300 can be kept away from the central direction. As is well known, when the arraying interval of antenna elements (i.e., the interval between the centers of two adjacent antenna elements) is greater than a half of the wavelength of the electromagnetic wave that is used, grating lobes will appear in the visible region of the antenna. As the arraying interval between antenna elements becomes greater, the directions in which grating lobes may occur will approach the azimuth of the main lobe. The gain of a grating lobe is higher than that of a secondary lobe, and is similar to the gain of a main lobe. Therefore, occurrence of any grating lobe may induce radar misdetections and deteriorations in the efficiency of the communication antenna. Accordingly, in the present example embodiment, only one row of conductive rods 124 is provided between two adjacent waveguide members 122 to reduce the slot interval along the X direction. This allows the influence of grating lobes to be reduced.

The waveguide surface 122a of each waveguide member 122 shown in FIG. 7C has a stripe shape (which may also be referred to as a "strip shape") extending along the Y direction. Each waveguide surface 122a is flat, and has a constant width (i.e., size along the X direction). However, the present disclosure is not limited to this example; the waveguide surface 122a may partially include a portion(s) which differs in height or width from any other portion. By intentionally providing such a portion(s), the characteristic impedance of the waveguide can be altered, thus altering the propagation wavelength of an electromagnetic wave within the waveguide, and/or adjusting the state of excitation at the position of each slot 112. In the present specification, a "stripe shape" means a shape which is defined by a single stripe, rather than a shape constituted by stripes. Not only shapes that extend linearly in one direction, but also any shape that bends or branches along the way is also encompassed by a "stripe shape". Even in the case where a portion(s) that undergoes a change in height or width is provided on the waveguide surface 122a, the shape still falls under the meaning of "stripe shape" so long as the shape includes a portion that extends in one direction as viewed from the normal direction of the waveguide surface 122a.

In the present example embodiment, the entire first conductive member 110 is composed of an electrically conductive material, and each slot 112 is an opening made in the first conductive member 110. However, slot the 112 is not limited to such a structure. For example, in a construction where the first conductive member 110 includes an internal dielectric layer and a superficial electrically conductive layer, the opening may only extend through the electrically conductive layer, and not through the dielectric layer, and this structure will still function as a slot.

As shown in FIG. 7B, the plurality of conductive rods 124 arrayed on the second conductive member 120 each have a leading end 124a opposing the conductive surface 110a. In the example shown in the figure, the leading ends 124a of the plurality of conductive rods 124 are on the same plane or substantially the same plane. This plane defines the surface 125 of an artificial magnetic conductor. Each conductive rod 124 does not need to be entirely electrically conductive, so long as it at least includes an electrically conductive layer that extends along the upper face and the side face of the rod-like structure. Although this electrically conductive layer may be located at the surface layer of the rod-like structure, the surface layer may be composed of an insulation coating or a resin layer with no electrically conductive layer existing on the surface of the rod-like structure. Moreover, the second conductive member 120 does not need to be entirely electrically conductive, so long as it can support the plurality of conductive rods 124 to constitute an artificial magnetic conductor. Of the surfaces of the second conductive member 120, a face carrying the plurality of conductive rods 124 may be electrically conductive, such that the electrical conductor electrically interconnects the surfaces of adjacent ones of the plurality of conductive rods 124. Moreover, the electrically conductive layer of the second conductive member 120 may be covered with an insulation coating or a resin layer. In other words, the entire combination of the second conductive member 120 and the plurality of conductive rods 124 may at least include an electrically conductive layer with rises and falls opposing the conductive surface 110a of the first conductive member 110.

The waveguide extending between the first conductive member 110 and each waveguide member 122 shown is open at both ends. Although not shown in FIGS. 7A through 7C, a choke structure may be provided near both ends of each waveguide member 122. A choke structure is typically composed of: an additional transmission line having a length of approximately $\lambda 0/8$; and a plurality of grooves having a depth of approximately $\lambda 0/4$, or a row of electrically conductive rods having a height of approximately $\lambda 0/4$, that are disposed at an end of that additional transmission line. The choke structure confers a phase difference of about 180° ($\pi$) between the incident wave and a reflected wave. Thus, electromagnetic waves are restrained from leaking at both ends of the waveguide member 122.

The preferable length of an additional transmission line in a choke structure has been believed to be $\lambda r/4$, where $\lambda r$ is the wavelength of a signal wave on the transmission line. However, the inventors have found that electromagnetic wave leakage can be suppressed and good functionality can be attained even when the length of an additional transmission line in a choke structure is shorter than $\lambda r/4$. In actuality, it is more preferable that the length of the additional transmission line is equal to or less than $\lambda 0/4$, which is even shorter than $\lambda r/4$. In an example embodiment according to the present disclosure, the length of the additional transmission line may be se to equal to or greater than $\lambda 0/16$ and less than $\lambda 0/4$. Examples of such construction will be later described as Example Embodiment 3.

Although not shown, the waveguiding structure in the slot array antenna 300 has a port (throughhole) that is connected to a transmission circuit or reception circuit (i.e., an electronic circuit) not shown. The port may be provided at one end or an intermediate position (e.g., a central portion) of each waveguide member 122 shown in FIG. 7C, for example. A signal wave which is sent from the transmission circuit via the port propagates through the waveguide extending upon the waveguide member 122, and is radiated through each slot 112. On the other hand, an electromagnetic wave which is led into the waveguide through each slot 112 propagates to the reception circuit via the port. At the rear side of the second conductive member 120, a structure including another waveguide that is connected to the transmission circuit or reception circuit (which in the present specification may also be referred to as a "distribution layer" or "feeding layer") may be provided. In that case, the port serves to couple between the waveguide in the distribution layer or feeding layer and the waveguide on the waveguide member 122.

In this example, two adjacent slots 112 along the X direction are excited with an equiphase. Therefore, the feeding path is arranged so that the transmission distances from the transmission circuit to two such slots 112 are equal. Two such slots 112 may be excited with an equiphase and equiamplitude. Furthermore, the distance between the centers of two adjacent slots 112 along the Y direction may be designed equal to the wavelength $\lambda g$ in the waveguide. As a result of this, electromagnetic waves with an equiphase are radiated from all slots 112, whereby a transmission antenna with a high gain can be realized.

Note that the interval between the centers of two adjacent slots 112 along the Y direction may have a different value from that of the wavelength λg. This will allow a phase difference to occur at the positions of the plurality of slots 112, so that the azimuth at which the radiated electromagnetic waves will strengthen one another can be shifted from the frontal direction to another azimuth in the YZ plane. Thus, with the slot antenna 200 shown in FIG. 8, directivity within the YZ plane can be adjusted. Moreover, it is not necessary for two adjacent slots 112 along the X direction to be excited strictly with an equiphase. Depending on the purpose, a phase difference of less than π/4 will be tolerated.

An antenna device including a two-dimensional array of such plural slots 112 on a plate-like conductive member 110 may also be called a flat panel array antenna device. Depending on the purpose, the plurality of slot rows placed side-by-side along the X direction may vary in length (i.e., in terms of distance between the slots at both ends of each slot row). A staggered array may be adopted such that, between two adjacent rows along the X direction, the positions of the slots are shifted along the Y direction. Depending on the purpose, the plurality of slot rows and the plurality of waveguide members may include portions which are not parallel but are angled. Without being limited to an implementation where the waveguide surface 122a of each waveguide member 122 opposes all of the slots 112 being placed side-by-side along the Y direction, it suffices if each waveguide surface 122a opposes at least one slot among the plural slots that are placed side-by-side along the Y direction.

Figure 8:
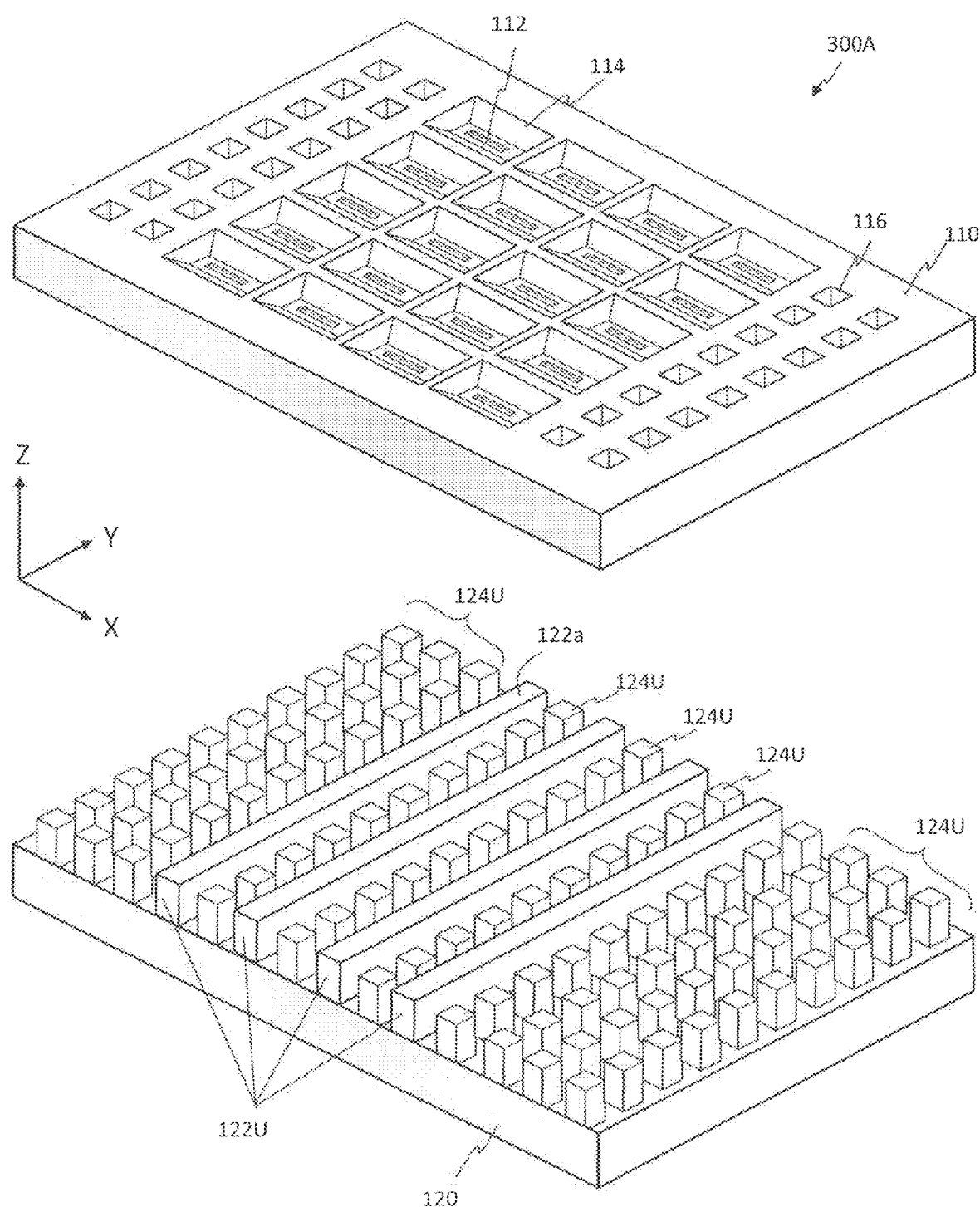
FIG. 8 is a perspective view schematically showing a part of the structure of a slot array antenna device having a horn 114 for each slot 112 according to an example embodiment of the present disclosure.

FIG. 8 is a perspective view schematically showing a partial structure of a slot array antenna 300A which includes a horn 114 for each slot 112. The slot array antenna 300A includes: a first conductive member 110 having a two-dimensional array of a plurality of slots 112 and a plurality of horns 114 thereon; and a second conductive member 120 on which a plurality of waveguide members 122U and a plurality of conductive rods 124U are arrayed. The plurality of slots 112 of the first conductive member 110 are arrayed along a first direction (the Y direction), which extends along the conductive surface 110a of the first conductive member 110, and a second direction (the X direction) that intersects (or, in this example, is orthogonal to) the first direction. For simplicity, any port or choke structure to be provided at an end or center of each waveguide member 122U is omitted from illustration in FIG. 8.

Figure 9A:
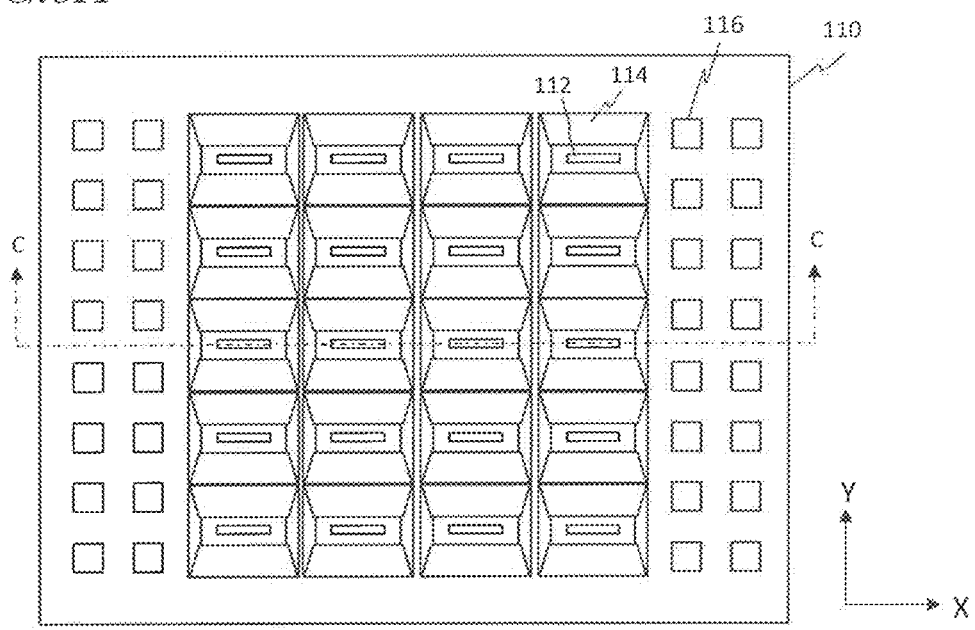
FIG. 9A is an upper plan view of the array antenna device shown in FIG. 8 as viewed from the +Z direction.
Figure 9B:
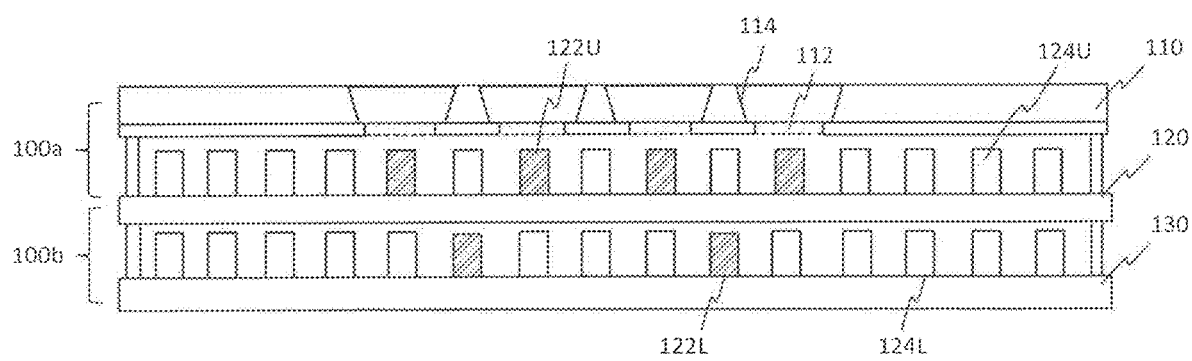
FIG. 9B is a cross-sectional view taken along line C-C in FIG. 9A.

FIG. 9A is an upper plan view of an array antenna 300A shown in FIG. 8, which includes 20 slots 112 in an array of 5 rows and 4 columns, as viewed from the +Z direction. FIG. 9B is a cross-sectional view taken along line C-C in FIG. 9A. The first conductive member 110 in this array antenna 300A includes a plurality of horns 114, which are placed so as to respectively correspond to the plurality of slots 112. Each of the plurality of horns 114 has four electrically conductive walls surrounding the slot 112. Such horns 114 allow directivity characteristics to be improved.

In the illustrated array antenna 300A, a first waveguide device 100a that includes waveguide members 122U directly coupling to the slots 112 and a second waveguide device 100b that includes another waveguide member 122L coupling to the waveguide members 122U of the first waveguide device 100a are layered. The waveguide member 122L and the conductive rods 124L of the second waveguide device 100b are disposed on the third conductive member 130. The second waveguide device 100b is basically similar in construction to the first waveguide device 100a.

As shown in FIG. 9A, the first conductive member 110 has the plurality of slots 112, which are arranged along the first direction (the Y direction) and along a second direction (the X direction) that is orthogonal to the first direction. The waveguide surface 122a of each waveguide member 122U extends along the Y direction, and is opposed to four of the plurality of slots 112 that neighbor one another along the Y direction. Although the first conductive member 110 in this example has 20 slots 112 arranged in 5 rows by 4 columns, the number of slots 112 is not limited thereto. Without being limited to the example where each waveguide member 122U is opposed to all slots that neighbor one another along the Y direction among the plurality of slots 112, each waveguide member 122U may at least be opposed to two slots neighboring each other along the Y direction. The interval between the centers of any two adjacent waveguide surfaces 122a may be set to be shorter than the wavelength λo, and in one example, shorter than the wavelength λo/2, for example.

Figure 9C:
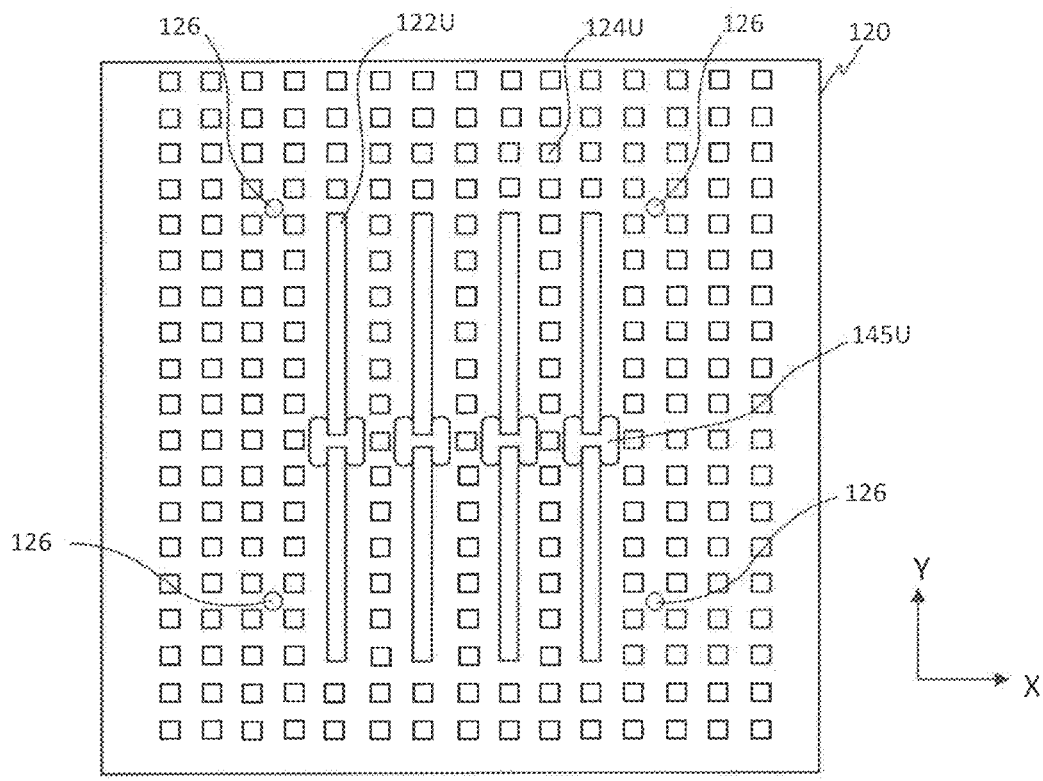
FIG. 9C is a diagram showing the planar layout of waveguide members 122U of a first waveguide device 100A according to an example embodiment of the present disclosure.
Figure 9D:
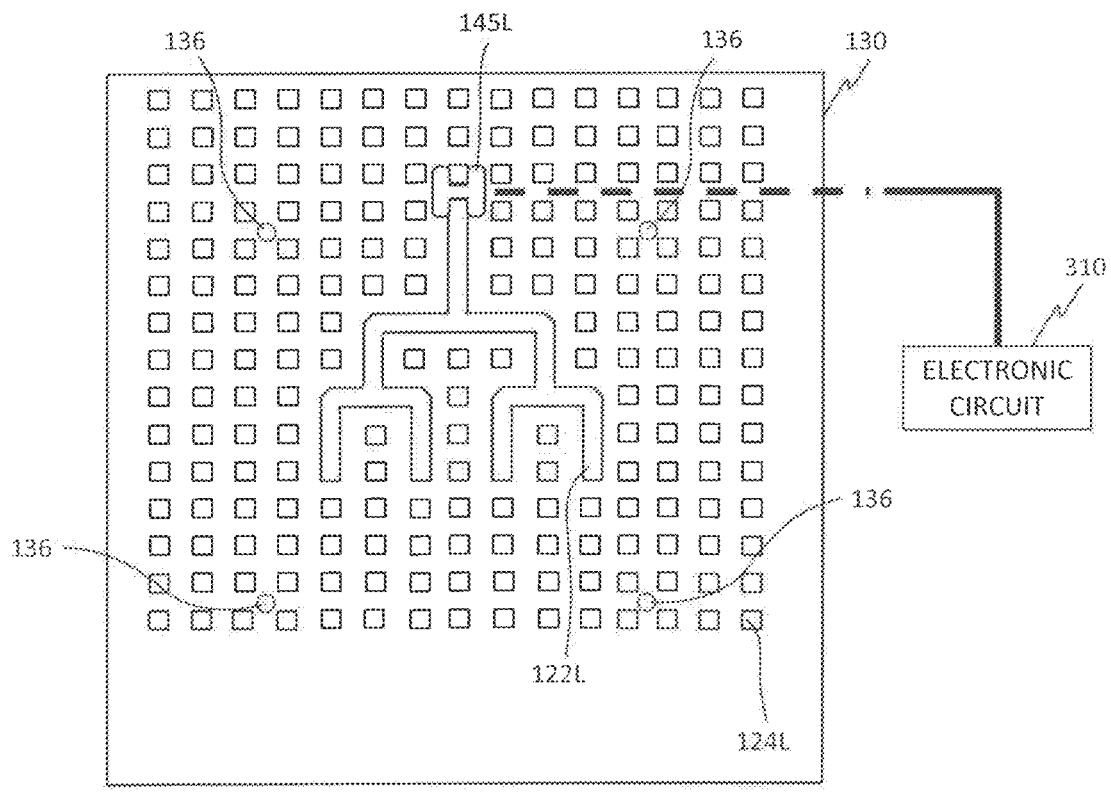
FIG. 9D is a diagram showing the planar layout of a waveguide member 122L of a second waveguide device 100B according to an example embodiment of the present disclosure.

FIG. 9C is a diagram showing a planar layout of the plurality of waveguide members 122U in the first waveguide device 100a. FIG. 9D is a diagram showing a planar layout of a waveguide member 122L in the second waveguide device 100b. As is clear from these figures, the waveguide members 122U of the first waveguide device 100a extend linearly, and include no branching portions or bends; on the other hand, the waveguide member 122L of the second waveguide device 100b includes both branching portions and bends. The combination of the "second conductive member 120" and the "third conductive member 140" in the second waveguide device 100b corresponds to the combination in the first waveguide device 100a of the "first conductive member 110" and the "second conductive member 120".

The second conductive member 120 shown in FIG. 9C and the third conductive member 130 shown in FIG. 9D have throughholes 126 and 136, respectively. In this example, the inner diameters of the throughholes 126 and 136 are smaller than the widths of the conductive rods 124L and the conductive rods 124U. The throughholes 126 and 136 are located within the array of conductive rods 124U, and have their openings in between the conductive rods 124U. The throughholes 126 and 136 can be used as screw holes for fixing the second conductive member 120 or the third conductive member 130, or as holes in which pins for use in positioning are accommodated. Although the array of conductive rods 124U is a structure for preventing leakage of electromagnetic waves that propagate along each waveguide member 122U, the function of leakage prevention is not lost even if the structure is partially holed.

Only one row of conductive rods 124U exists between the throughholes 126 and each waveguide member 122U. In other words, among the rows of conductive rods 124U extending along each waveguide member 122U, the throughholes 126 are disposed between the row that is the closest to the waveguide member 122U and the row that is the second closest to the waveguide member 122U. Even if such throughholes exist between the closest row to the waveguide member 122U and the waveguide member 122U, leakage of electromagnetic waves can be prevented; on the other hand, characteristics of the waveguide that is constituted by the waveguide member 122U may be affected. However again, such changes in the characteristics are much smaller, i.e., often tolerably small, in the case where the throughholes 126 are provided in the aforementioned positions. Therefore, even if such throughholes, e.g., holes for use in positioning, are additionally disposed after designing of the waveguides is completed, the waveguide structure does not need to be modified substantially. Such a property will be useful in the actual product design. Moreover, since the throughholes 126 can be disposed in relatively close positions to the waveguide member 122U, the dimensions of the waveguide device do not need to be made overly large for accommodating the holes.

The waveguide members 122U of the first waveguide device 100a couple to the waveguide member 122L of the second waveguide device 100b, through ports (throughholes) 145U that are provided in the second conductive member 120. Stated otherwise, an electromagnetic wave which has propagated through the waveguide member 122L of the second waveguide device 100b passes through a port 145U to reach a waveguide member 122U of the first waveguide device 100a, and propagates through the waveguide member 122U of the first waveguide device 100a. In this case, each slot 112 functions as an antenna element (radiating element) to allow an electromagnetic wave which has propagated through the waveguide to be radiated into space. Conversely, when an electromagnetic wave which has propagated in space impinges on a slot 112, the electromagnetic wave couples to the waveguide member 122U of the first waveguide device 100a that lies directly under that slot 112, and propagates through the waveguide member 122U of the first waveguide device 100a. An electromagnetic wave which has propagated through a waveguide member 122U of the first waveguide device 100a may also pass through a port 145U to reach the waveguide member 122L of the second waveguide device 100b, and propagate through the waveguide member 122L of the second waveguide device 100b. Via a port 145L of the third conductive member 130, the waveguide member 122L of the second waveguide device 100b may couple to an external waveguide device or a radio frequency circuit (electronic circuit). As one example, FIG. 9D illustrates an electronic circuit 310 which is connected to the port 145L. Without being limited to a specific position, the electronic circuit 310 may be provided at any arbitrary position. The electronic circuit 310 may be provided on a circuit board which is on the rear surface side (i.e., the lower side in FIG. 9B) of the third conductive member 130, for example. Such an electronic circuit 310 is a microwave integrated circuit, e.g. an MMIC (Monolithic Microwave Integrated Circuit) that generates or receives millimeter waves, for example.

The first conductive member 110 shown in FIG. 9A may be called a "radiation layer". The entirety of the second conductive member 120, the plurality of waveguide members 122U, and the plurality of conductive rods 124U shown in FIG. 9D may be called an "excitation layer", while the entirety of the third conductive member 130, the waveguide member 122L, and the plurality of conductive rods 124L shown in FIG. 9D may be called a "distribution layer". Moreover, the "excitation layer" and the "distribution layer" may be collectively called a "feeding layer". Each of the "radiation layer", the "excitation layer", and the "distribution layer" can be mass-produced by processing a single metal plate. The radiation layer, the excitation layer, the distribution layer, and any electronic circuitry to be provided on the rear face side of the distribution layer may be produced as a single-module product.

In the array antenna of this example, as can be seen from FIG. 9B, a radiation layer, an excitation layer, and a distribution layer are layered, which are in plate form. Therefore, a flat and low-profile flat panel antenna is realized as a whole. For example, the height (thickness) of a multilayer structure having a cross-sectional construction as shown in FIG. 9B can be 10 mm or less.

With the waveguide member 122L shown in FIG. 9D, the distances along the waveguides from the port 145L of the third conductive member 130 to the respective ports 145U (see FIG. 9C) of the second conductive member 120, as measured along the waveguide member 122L, are all set to an identical value. Therefore, a signal wave which is input to the waveguide member 122L reaches the four ports 145U of the second conductive member 120 all in the same phase, from the port 145L of the third conductive member 130. As a result, the four waveguide members 122U on the second conductive member 120 can be excited in the same phase.

Depending on the purpose, it is not necessary for all slots 112 functioning as antenna elements to radiate electromagnetic waves in the same phase. In the construction shown in FIG. 9D, the distances from the port 145L of the third conductive member 130 to the respective ports 145U of the second conductive member 120 (see FIG. 9C), as measured along the waveguide, may differ from one another. The network patterns of the waveguide members 122 in the excitation layer and the distribution layer (i.e., layers included in the feeding layer) may be arbitrary, without being limited to what is shown.

The electronic circuit 310 is connected to a waveguide extending above each waveguide member 122U, via the ports 145U and 145L shown in FIG. 9C and FIG. 9D. A signal wave which is output from the electronic circuit 310 is subject to branching in the distribution layer, and then propagates on the plurality of waveguide members 122U, until reaching the plurality of slots 112. In order to ensure that the signal waves have an equal phase at the positions of two adjacent slots 112 along the X direction, the total waveguide lengths from the electronic circuit 310 to the two adjacent slots 112 along the X direction may be designed to be substantially equal, for example.

The numbers, shapes, dimensions, and arrangements of slots 112, throughholes 116, waveguide members 122, conductive rods 124, and horns 114 in each antenna device described above are only examples, which are subject to change depending on the application or purpose.

An antenna device according to an example embodiment of the present disclosure can be suitably used in a radar device or a radar system to be incorporated in moving entities such as vehicles, marine vessels, aircraft, robots, or the like, for example. A radar device would include an antenna device according to any of the aforementioned example embodiments and a microwave integrated circuit that is connected to the antenna device. A radar system would include the radar device and a signal processing circuit that is connected to the microwave integrated circuit of the radar device. Since an antenna device according to an example embodiment of the present disclosure includes a multilayered WRG structure which permits downsizing, the area of the face on which antenna elements are arrayed can be tremendously reduced as compared to a conventional construction utilizing a hollow waveguide. Therefore, a radar system incorporating the antenna device can be easily mounted in a narrow place such as a face of a rearview mirror in a vehicle that is opposite to its specular surface, or a small-sized moving entity such as a UAV (an Unmanned Aerial Vehicle, a so-called drone). Note that, without being limited to the implementation where it is mounted in a vehicle, a radar system may be used while being fixed on the road or a building, for example.

An antenna device according to an example embodiment of the present disclosure can also be used in a wireless communication system. Such a wireless communication system would include an antenna device according to any of the above example embodiments and a communication circuit (a transmission circuit or a reception circuit).

An antenna device according to an example embodiment of the present disclosure can further be used as an antenna in an indoor positioning system (IPS). An indoor positioning system is able to identify the position of a moving entity, such as a person or an automated guided vehicle (AGV), that is in a building. An antenna device can also be used as a radio wave transmitter (beacon) for use in a system which provides information to an information terminal device (e.g., a smartphone) that is carried by a person who has visited a store or any other facility. In such a system, once every several seconds, a beacon may radiate an electromagnetic wave carrying an ID or other information superposed thereon, for example. When the information terminal device receives this electromagnetic wave, the information terminal device transmits the received information to a remote server computer via telecommunication lines. Based on the information that has been received from the information terminal device, the server computer identifies the position of that information terminal device, and provides information which is associated with that position (e.g., product information or a coupon) to the information terminal device.

Thus, the antenna device can be utilized in various applications. Details of such application examples are disclosed in the specification of U.S. Pat. No. 9,786,995 and the specification of U.S. Pat. No. 10,027,032. The entire disclosure of the specification of U.S. Pat. No. 9,786,995 and the specification of U.S. Pat. No. 10,027,032 is incorporated herein by reference.

The present specification employs the term "artificial magnetic conductor" in describing the technique according to the present disclosure, this being in line with what is set forth in a paper by one of the inventors Kirino (H. Kirino and K. Ogawa, "A 76 GHz Multi-Layered Phased Array Antenna using a Non-Metal Contact Metamaterial Waveguide", IEEE Transaction on Antenna and Propagation, Vol. 60, No. 2, pp. 840-853, February, 2012) as well as a paper by Kildal et al., who published a study directed to related subject matter around the same time. However, it has been found through a study by the inventors that the disclosure according to the present disclosure does not necessarily require an "artificial magnetic conductor" under its conventional definition. That is, while a periodic structure has been believed to be a requirement for an artificial magnetic conductor, the disclosure according to the present disclosure does not necessary require a periodic structure in order to be practiced.

The artificial magnetic conductor according to the present disclosure is implemented as rows of conductive rods. Therefore, in order to restrain electromagnetic waves from leaking away from the waveguide surface, it has been believed essential that there exist at least two rows of conductive rods on one side of the waveguide member, such rows of conductive rods extending along the waveguide member (ridge). The reason is that it takes at least two rows of conductive rods for them to have a "period". However, according to a study by the inventors, even when only one row of conductive rods exists between two waveguide members extending in parallel, the intensity of signal leakage from one waveguide member to the other waveguide member can be suppressed to −10 dB or less. This is a practically sufficient value in many applications. The reason why such a sufficient level of separation is achieved with only an imperfect periodic structure is so far unclear. However, in view of this fact, in the present disclosure, the conventional notion of "artificial magnetic conductor" is extended so that the term also encompasses a structure including only one row of conductive rods.

A waveguide device and an electromagnetic radiation confinement device according to the present disclosure are usable in any technological field that utilizes electromagnetic waves. For example, they are available to various applications where transmission/reception of electromagnetic waves of the gigahertz band or the terahertz band is performed. In particular, they may be used in onboard radar systems, various types of monitoring systems, indoor positioning systems, wireless communication systems where downsizing is desired. A waveguide device and an electromagnetic radiation confinement device according to the present disclosure can also be used in chemical reaction devices and analysis devices that utilize electromagnetic waves.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A waveguide device comprising:
   a first electrical conductor including a first electrically conductive surface extending along a first direction and along a second direction that intersects the first direction;
   a second electrical conductor including a second electrically conductive surface opposing the first electrically conductive surface;
   a waveguide located between the first electrical conductor and the second electrical conductor and extending along the first direction, the waveguide including an electrically-conductive waveguide surface opposing the first electrically conductive surface; and
   a plurality of electrically-conductive rod rows located on opposite sides of the waveguide, each rod row including a plurality of electrically conductive rods arranged along the first direction, each electrically conductive rod including a root that is connected to the second electrically conductive surface and a leading end opposing the first electrically conductive surface; wherein
   at least one of the first electrical conductor and the second electrical conductor includes at least one hole that is located in a position adjacent to or overlapping an electrically conductive rod included in the plurality of rod rows as viewed along a third direction which is perpendicular or substantially perpendicular to both the first and second directions;
   an opening of the at least one hole has a width which is smaller than an interval between centers of two adjacent electrically conductive rods that are the closest to the hole among electrically conductive rods included in the plurality of rod rows; and
   the at least one hole is located in a position not overlapping the waveguide as viewed along the third direction.

2. The waveguide device of claim 1, wherein
   the plurality of rod rows include a first type of rod row that is adjacent to the waveguide and a second type of rod row that is adjacent to the first type of rod row; and as viewed along the third direction, a center of the opening of the at least one hole is located between the first type of rod row and the second type of rod row.

3. The waveguide device of claim 1, wherein the at least one hole includes a hole, a center of which is located among four mutually-adjacent electrically conductive rods included in the plurality of rod rows as viewed along the third direction.

4. The waveguide device of claim 3, wherein
the at least the second electrical conductor includes a plurality of holes; and
the plurality of holes include one or more holes extending through the second electrical conductor and through the waveguide or an electrically conductive rod included in the plurality of rod rows.

5. The waveguide device of claim 1, wherein
the at least one of the first electrical conductor and the second electrical conductor includes a plurality of holes;
the plurality of holes include two or more holes which are located in positions that are adjacent to or overlapping an electrically conductive rod included in the plurality of rod rows as viewed along the third direction;
openings of each of the two or more holes have a width which is smaller than an interval between centers of two adjacent electrically conductive rods that are the closest to the hole among electrically conductive rods included in the plurality of rod rows; and
each of the two or more holes is located in a position not overlapping the waveguide as viewed along the third direction.

6. The waveguide device of claim 1, wherein at least one of the first electrical conductor and the second electrical conductor include a plurality of holes.

7. The waveguide device of claim 6, wherein
the plurality of holes include one or more holes extending through the second electrical conductor and through the waveguide or an electrically conductive rod included in the plurality of rod rows; and
the plurality of holes include a hole that is located in a position overlapping the waveguide as viewed along the third direction.

8. A microwave chemical reaction device comprising:
the waveguide device of claim 6; and
a microwave generator that is connected to the waveguide device; wherein
the plurality of holes include a hole that is located in a position overlapping the waveguide as viewed along the third direction.

9. The waveguide device of claim 1, wherein
at least one of the first electrical conductor and the second electrical conductor includes a plurality of holes; and
the plurality of holes include a hole, a center of which is located among four mutually-adjacent electrically conductive rods included in the plurality of rod rows as viewed along the third direction.

10. The waveguide device of claim 1, wherein
the at least one of the first electrical conductor and the second electrical conductor includes a plurality of holes; and
the plurality of holes are arranged in rows and columns along the first direction and along the second direction.

11. The waveguide device of claim 1, wherein,
the at least one of the first electrical conductor and the second electrical conductor includes a plurality of holes;
the plurality of electrically conductive rods in each rod row are arranged along the first direction with a first period; and
the plurality of holes are disposed along the first direction with the first period and along the second direction with a second period.

12. The waveguide device of claim 1, wherein
the at least one of the first electrical conductor and the second electrical conductor includes a plurality of holes; and
the plurality of holes include a hole that is located in a position overlapping the waveguide as viewed along the third direction.

13. The waveguide device of claim 1, wherein
both of the first electrical conductor and the second electrical conductor include a plurality of holes; and
the plurality of holes include a hole that is located in a position overlapping the waveguide as viewed along the third direction.

14. A microwave chemical reaction device comprising:
the waveguide device of claim 13; and
a microwave generator that is connected to the waveguide device; wherein
the plurality of holes include a hole that is located in a position overlapping the waveguide as viewed along the third direction; and
the plurality of holes include one or more holes extending through the second electrical conductor and through the waveguide or an electrically conductive rod included in the plurality of rod rows.

15. The waveguide device of claim 1, wherein
the at least one of the first electrical conductor and the second electrical conductor includes a plurality of holes; and
the plurality of holes include a hole that is located in a position overlapping an electrically conductive rod included in the plurality of rod rows as viewed along the third direction.

16. The waveguide device of claim 1, wherein the at least one hole has a shape which is a circle, an ellipse, a polygon, or a rounded polygon as viewed along the third direction.

17. A microwave chemical reaction device comprising:
the waveguide device of claim 1; and
a microwave generator that is connected to the waveguide device.

18. An antenna device comprising:
the waveguide device of claim 1; and
one or more antenna elements that couple to a waveguide extending between the waveguide surface and the first electrically conductive surface of the waveguide device.

19. A radar device comprising:
the antenna device of claim 18; and
a microwave integrated circuit that is connected to the antenna device.

20. A radar device comprising:
the antenna device of claim 18; and
a microwave integrated circuit that is connected to the antenna device; wherein
the at least one hole includes a hole, a center of which is located among four mutually-adjacent electrically conductive rods included in the plurality of rod rows as viewed along the third direction.

21. An antenna device comprising:
the waveguide device of claim 1; and one or more antenna elements that couple to a waveguide extending between the waveguide surface and the first electrically conductive surface of the waveguide device; wherein the at least one hole includes a hole, a center of which is located among four mutually-adjacent electrically conductive rods included in the plurality of rod rows as viewed along the third direction.

22. An electromagnetic radiation confinement device comprising:
- a first electrical conductor including a first electrically conductive surface extending along a first direction and along a second direction that intersects the first direction;
- a second electrical conductor including a second electrically conductive surface opposing the first electrically conductive surface; and
- a plurality of electrically conductive rods arranged in rows and columns between the first electrical conductor and the second electrical conductor, each electrically conductive rod including a root that is connected to the second electrically conductive surface and a leading end opposing the first electrically conductive surface; wherein
- at least one of the first electrical conductor and the second electrical conductor includes at least one hole that is located in a position between two adjacent electrically conductive rods among the plurality of electrically conductive rods and opposing the second electrically conductive surface or the first electrically conductive surface, or in a position overlapping an electrically conductive rod included in the plurality of electrically conductive rods, as viewed along a third direction which is perpendicular to both the first and second directions; and
- an opening of the at least one hole has a width which is smaller than an interval between centers of two adjacent electrically conductive rods that are the closest to the hole among the plurality of electrically conductive rods.

23. The electromagnetic radiation confinement device of claim 22, wherein
- at least one of the first electrical conductor and the second electrical conductor include a plurality of holes;
- the at least one hole is included in the plurality of holes; and
- the plurality of holes include a hole, a center of which is located among four mutually-adjacent electrically conductive rods included in the plurality of rod rows as viewed along the third direction.

24. The electromagnetic radiation confinement device of claim 23, wherein the plurality of holes include a hole that extends through the second electrical conductor and through one of the plurality of electrically conductive rods.

* * * * *